(12) United States Patent
Hsiao et al.

(10) Patent No.: US 12,436,954 B2
(45) Date of Patent: Oct. 7, 2025

(54) TECHNIQUES FOR CONFIGURING WORKFLOW EVENT PROCESSING AND IDENTIFIER FEDERATION

(71) Applicant: Oracle International Corporation, Redwood Shores, CA (US)

(72) Inventors: Eric Hsiao, San Mateo, CA (US); Jeffrey Toillion, Scottsdale, AZ (US); Amy Yang, Beijing (CN); Bingqing Shang, Beijing (CN); Dennis M. Chin, Stow, OH (US); Robert Carina, Pottersville, NJ (US); Simone Geib, Redwood City, CA (US); Santosh Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 316 days.

(21) Appl. No.: 16/896,990

(22) Filed: Jun. 9, 2020

(65) Prior Publication Data

US 2021/0110328 A1 Apr. 15, 2021

Related U.S. Application Data

(60) Provisional application No. 62/914,938, filed on Oct. 14, 2019, provisional application No. 62/914,939, filed on Oct. 14, 2019.

(51) Int. Cl.
*G06F 16/248* (2019.01)
*G06F 9/54* (2006.01)
(Continued)

(52) U.S. Cl.
CPC ........ *G06F 16/24568* (2019.01); *G06F 9/546* (2013.01); *G06F 16/168* (2019.01);
(Continued)

(58) Field of Classification Search
CPC .............. G06F 16/2456; G06F 16/248; G06F 16/24568; G06F 9/546; G06F 16/168;
(Continued)

(56) References Cited

U.S. PATENT DOCUMENTS 9,639,662 B2 5/2017 Sethumadhavan et al.
10,764,315 B1 * 9/2020 Carroll ................ H04L 12/4625
(Continued)

OTHER PUBLICATIONS

U.S. Appl. No. 16/896,891, Non-Final Office Action, mailed on Nov. 24, 2021, 6 pages.

(Continued)

*Primary Examiner* — Rayeez R Chowdhury
(74) *Attorney, Agent, or Firm* — Kilpatrick Townsend & Stockton LLP

(57) ABSTRACT

Event processing techniques for updating a database in real time based on events in a continuous event stream are disclosed. The techniques can update the database to incorporate information from thousands of received events per second. The events can include metrics measuring milestones for an organizational process defined by a user. Moreover, multiple streams can include metrics from many tenants concurrently. The techniques include receiving, from a first user device, information identifying a group identifier for a first action object. The techniques then include assigning the identifier to the first action object and to at least one other action object. The techniques then include transmitting, to a service provider, data identifying the assignment of the group identifier, receiving second information identifying events processed by the service provider, identifying events corresponding to the identifier, and generating a user interface configured to present elements corresponding to the identified events.

20 Claims, 19 Drawing Sheets

(51) Int. Cl.
*G06F 16/16* (2019.01)
*G06F 16/17* (2019.01)
*G06F 16/23* (2019.01)
*G06F 16/2455* (2019.01)
*G06F 21/16* (2013.01)
*G06Q 10/0631* (2023.01)

(52) U.S. Cl.
CPC ...... *G06F 16/1734* (2019.01); *G06F 16/2322* (2019.01); *G06F 16/2358* (2019.01); *G06F 16/2456* (2019.01); *G06F 16/248* (2019.01); *G06F 21/16* (2013.01); *G06Q 10/06316* (2013.01)

(58) Field of Classification Search
CPC ............. G06F 16/1734; G06F 16/2322; G06F 16/2358; G06F 21/16
USPC ........................................................ 715/700
See application file for complete search history.

(56) References Cited

U.S. PATENT DOCUMENTS

| | | | |
|---|---|---|---|
| 11,106,658 B2 | 8/2021 | Cseri et al. | |
| 11,308,078 B2 | 4/2022 | Cseri et al. | |
| 11,687,863 B2 | 6/2023 | Granholm et al. | |
| 11,715,106 B2 | 8/2023 | Allbright | |
| 11,741,415 B2 | 8/2023 | Granholm et al. | |
| 11,899,718 B2 | 2/2024 | Nair | |
| 11,907,228 B2 | 2/2024 | Hsiao et al. | |
| 2003/0229900 A1 | 12/2003 | Reisman | |
| 2012/0243028 A1* | 9/2012 | Dumitrescu | G06F 3/1204 358/1.15 |
| 2014/0095483 A1* | 4/2014 | Toillion | G06F 16/9024 707/722 |
| 2014/0108382 A1* | 4/2014 | Garg | G06F 16/335 707/737 |
| 2015/0135206 A1 | 5/2015 | Reisman | |
| 2015/0135214 A1 | 5/2015 | Reisman | |
| 2015/0317399 A1* | 11/2015 | Akselrod | G06F 16/9535 707/723 |
| 2015/0339339 A1* | 11/2015 | Mastrodonato | G06F 16/214 707/805 |
| 2016/0170838 A1* | 6/2016 | Erickson | G06F 11/3476 711/162 |
| 2016/0364405 A1* | 12/2016 | Konik | G06F 16/2358 |
| 2017/0236067 A1* | 8/2017 | Tjiong | G06F 3/0486 706/11 |
| 2017/0270529 A1 | 9/2017 | Ebel et al. | |
| 2017/0366440 A1* | 12/2017 | Sheleheda | H04L 41/0613 |
| 2018/0136987 A1* | 5/2018 | He | G06F 9/542 |
| 2018/0239796 A1* | 8/2018 | Song | G06F 16/282 |
| 2018/0268167 A1* | 9/2018 | Alberton | G06Q 50/01 |
| 2019/0294720 A1* | 9/2019 | Beringer | G06F 16/26 |
| 2020/0012601 A1* | 1/2020 | Jeong | G06F 3/0604 |
| 2021/0109935 A1 | 4/2021 | Hsiao et al. | |
| 2021/0110328 A1 | 4/2021 | Hsiao et al. | |
| 2021/0357391 A1 | 11/2021 | Cseri et al. | |
| 2022/0300515 A1 | 9/2022 | Hsiao et al. | |

OTHER PUBLICATIONS

U.S. Appl. No. 16/896,891, Notice of Allowance, mailed on May 10, 2022, 14 pages.
U.S. Appl. No. 17/834,827, "Non-Final Office Action", Mar. 27, 2023, 10 pages.
U.S. Appl. No. 17/834,827, "Notice of Allowance", Oct. 10, 2023, 8 pages.
U.S. Appl. No. 18/408,786, Non-Final Office Action mailed on Aug. 9, 2024, 10 pages.

* cited by examiner

FIG. 4

TECHNIQUES FOR CONFIGURING WORKFLOW EVENT PROCESSING AND IDENTIFIER FEDERATION

CROSS-REFERENCE TO RELATED APPLICATIONS

The present application is a non-provisional application of, and claims the benefit and priority under 35 U.S.C. 119(e) of U.S. Provisional Application No. 62/914,939, filed Oct. 14, 2019, entitled "TECHNIQUES FOR CONFIGURING WORKFLOW EVENT PROCESSING AND IDENTIFIER FEDERATION," and U.S. Provisional Application No. 62/914,938, filed Oct. 14, 2019, entitled "TECHNIQUES FOR IN-MEMORY STITCHING," the entire contents of which are incorporated by reference for all purposes.

The following U.S. Patent Application is being filed concurrently herewith, and the entire disclosure of the application is incorporated by reference into the present application for all purposes:

U.S. application Ser. No. 16/896,891, filed on Jun. 9, 2020, entitled "TECHNIQUES FOR IN-MEMORY STITCHING," now U.S. Pat. No. 11,386,094.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs.

BRIEF SUMMARY

An event processing system for updating a database in real time based on events in a continuous event stream is disclosed. The system can update the database to incorporate information in thousands of received events per second. The events can include metrics measuring milestones for an organizational process defined by a user. Moreover, multiple streams can include metrics from many tenants concurrently.

The system can receive a plurality of events of an event stream, the plurality of events corresponding to a time interval of a watermark. The system can then load the plurality of events corresponding to the time interval of the watermark to a staging area of a memory accessible to the computing device. The system can then identify that a first event and a second event of the plurality of events in the staging area correspond to the time interval of the watermark and share a value of a key attribute. The system can then cause a combined database record to be generated in the memory, the combined database record comprising a combination of at least: first attribute information from the first event; second attribute information from the second event; and the value of the key attribute. The system can then receive a trigger signal. At least in response to receiving the trigger signal, the system can then transmit, to a database manager, a single message to update a database, the single message based at least in part on the combined database record.

In an embodiment, the single message comprises a database merge statement.

In an embodiment, the single message comprises one or more of a database update statement, a database create statement, a database delete statement, or a database insert statement.

In an embodiment, the single message comprises a Java Database Connectivity (JDBC) statement or a Hive statement.

In an embodiment, the single message to update the database is further based at least in part on a second combined database record in the memory, the second combined database record comprising attribute information from other events corresponding to the time interval of the watermark and sharing a second value of the key attribute.

In an embodiment, causing the combined database record to be generated comprises applying a User Defined Aggregation Function (UDAF) or a custom function.

In an embodiment, causing the combined database record to be generated comprises binding the first attribute information from the first event and the second attribute information together based at least in part on the first event and the second event sharing the value of the key attribute.

In an embodiment, the plurality of events correspond to metrics of one or more workflows, wherein the one or more workflows are configured via a configuration user interface.

In an embodiment, the system can further generate a dashboard user interface comprising graphical controls configured to display statistics based at least in part on the updated database. The system can then provide the dashboard user interface to a client device for display.

In another aspect of this disclosure, the system can receive, from a first user device, first information that identifies a group identifier for a first action object of a plurality of action objects. The system can then assign the group identifier to the first action object and to at least one other action object. The system can then transmit, to a service provider, data that identifies the assignment of the group identifier to the first action object and to the at least one other action object. The system can then receive, from the service provider, second information that identifies events processed by the service provider. The system can then identify which of the received events correspond to the group identifier. The system can then generate a user interface configured to present elements that correspond to the identified events. The system can then provide the user interface to the first user device for presenting a dashboard that includes the elements that correspond to the identified events.

In an embodiment, the system can further generate a configuration user interface configured to present the plurality of action objects for each of a plurality of workflows.

In an embodiment, at least some of the plurality of workflows correspond to different respective applications executed on behalf of the first user device.

In an embodiment, the system can further provide the configuration user interface for presentation at the first user device.

In an embodiment, the at least one other action object corresponds to a different workflow of the plurality of workflows from a first workflow of the plurality of workflows that correspond to the first action object.

In an embodiment, the first information is received from the configuration user interface of the first user device.

In an embodiment, the service provider comprises an in-memory stitching engine.

In an embodiment, the in-memory stitching engine is configured to stitch events corresponding to at least one of the first action object or the at least one other action object.

In an embodiment, the second information that identifies events processed by the service provider comprises event data that corresponds to at least one of the first action object or the at least one other action object.

In an embodiment, the user interface is generated based at least in part on the first action object or the at least one other action object corresponding to the group identifier.

BRIEF DESCRIPTION OF THE DRAWINGS

FIG. 4 illustrates an example of in-memory stitching of incoming data from an event stream to update a database, in accordance with an embodiment of the present disclosure.

DETAILED DESCRIPTION OF THE DISCLOSURE

Figure 1:
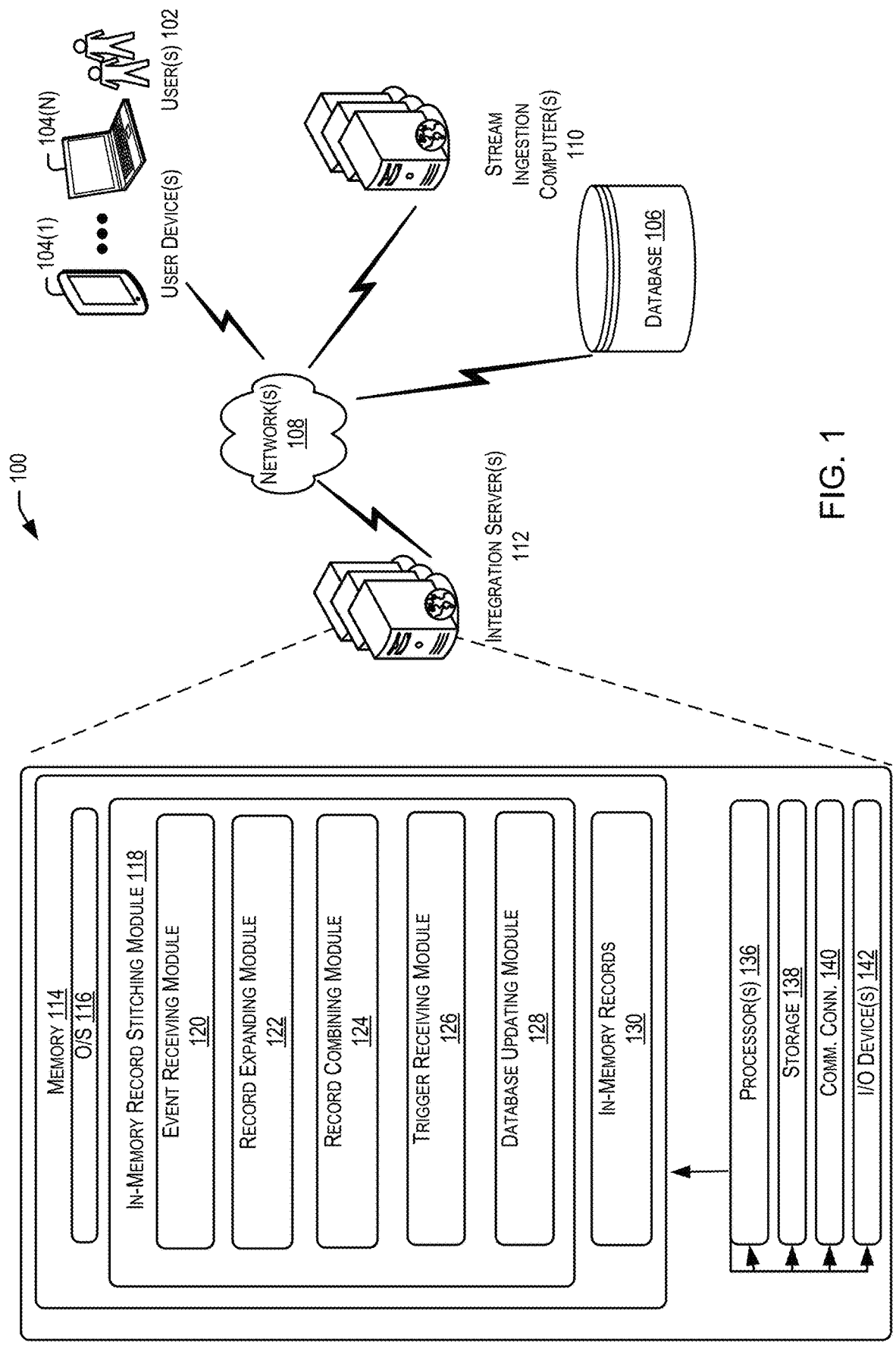
FIG. 1 illustrates an example system for updating a database in real time with incoming data from an event stream.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL) which allows applications to filter, query, and perform pattern matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<timestamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

. . .

(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)

. . .

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted, a stream may be the principal source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation, that archived relation may also indicate that there are certain entities it can call to query for historical context, for example. In some examples, a data definition language (DDL) may indicate annotations about the archived relation such as, but not limited to, how do to the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, down-stream operators. So, one approach is to store this entire table here. However, utilizing archived relations, the system may analyze the query graph and decide which of the lowest stateful operator that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum (c1) from R1 where c2>c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archived relation may be specified by a user. A window, in some aspects, in relation to an archived relation, may include a node in a query graph that analyzes or otherwise evaluates incoming streamed content. In other words, the window may define the amount of streamed content that be analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples which are within window limits may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspects, the CQL engine and/or CEP engine may traditionally process streams or non-archived relations, so there may be no initial state. For example, a query may be loaded, wherein it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it runs the query, things can go into JMS and be published where the engine wasn't listening. So, the engine may be configured to setup the listener first, run the archive query, and then return and start pulling out of the queue, in order to avoid missing any events. Thus, the JMS may queue things up and, if things back up while the engine is doing a query, the engine can catch up later and it doesn't have to worry about whether it's synchronous. If it's not here, listening, it won't miss it, it just gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context) wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS. Additionally, in some cases, multiple output servers may be utilized (in compliance with JTA and/or to implement high availability (HA), wherein each server may manage a single set of context/transaction tables that are completely separate from the other tables managed by the other servers.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.

Event Processing Applications

The quantity and speed of both raw infrastructure and business events is exponentially growing in IT environments. Whether it is streaming stock data for financial services, streaming satellite data for the military or real-time vehicle-location data for transportation and logistics businesses, companies in multiple industries must handle large volumes of complex data in real-time. In addition, the explosion of mobile devices and the ubiquity of high-speed connectivity adds to the explosion of mobile data. At the same time, demand for business process agility and execution has also grown. These two trends have put pressure on organizations to increase their capability to support event-driven architecture patterns of implementation. Real-time event processing requires both the infrastructure and the application development environment to execute on event processing requirements. These requirements often include the need to scale from everyday use cases to extremely high velocities of data and event throughput, potentially with latencies measured in microseconds rather than seconds of response time. In addition, event processing applications must often detect complex patterns in the flow of these events.

The Oracle Stream Analytics platform targets a wealth of industries and functional areas. The following are some use cases:

Telecommunications: Ability to perform real-time call detail (CDR) record monitoring and distributed denial of service attack detection.

Financial Services: Ability to capitalize on arbitrage opportunities that exist in millisecond or microsecond windows. Ability to perform real-time risk analysis, monitoring and reporting of financial securities trading and calculate foreign exchange prices.

Transportation: Ability to create passenger alerts and detect baggage location in case of flight discrepancies due to local or destination-city weather, ground crew operations, airport security, etc.

Public Sector/Military: Ability to detect dispersed geographical enemy information, abstract it, and decipher high probability of enemy attack. Ability to alert the most appropriate resources to respond to an emergency.

Insurance: Ability to learn and to detect potentially fraudulent claims.

IT Systems: Ability to detect failed applications or servers in real-time and trigger corrective measures.

Supply Chain and Logistics: Ability to track shipments in real-time and detect and report on potential delays in arrival.
Real Time Streaming & Event Processing Analytics With exploding data from increased number of connected devices, there is an increase in large volumes of dynamically changing data; not only the data moving within organizations, but also outside the firewall. High-velocity data brings high value, especially to volatile business processes. However, some of this data loses its operational value in a short time frame. Big Data allows the luxury of time in processing for actionable insight. Fast Data, on the other hand, requires extracting the maximum value from highly dynamic and strategic data. It requires processing much faster and facilitates taking timely action as close to the generated data as possible. The Oracle Stream Analytics platform delivers on Fast Data with responsiveness. Oracle Edge Analytics pushes processing to the network edge, correlating, filtering and analyzing data for actionable insight in real-time.

The Oracle Stream Analytics platform provides ability to join the incoming streaming events with persisted data, thereby delivering contextually aware filtering, correlation, aggregation and pattern matching. It delivers lightweight, out of the box adapters for common event sources. It also provides an easy-to-use adapter framework for custom adapter development. With this platform, organizations can identify and anticipate opportunities, and threats represented by seemingly unrelated events. Its incremental processing paradigm can process events using a minimum amount of resources providing extreme low latency processing. It also allows it to create extremely timely alerts, and detect missing or delayed events immediately, such as the following:

Correlated events: If event A happens, event B almost always follows within 2 seconds of it.

Missing or Out-of-Sequence events: Events A, B, C should occur in order. C is seen immediately after A, without B.

Causal events: Weight of manufactured items is slowly trending lower or the reading falls outside acceptable norms. This signals a potential problem or future maintenance need.

In addition to real-time event sourcing, the Oracle Stream Analytics platform design environment and runtime execution supports standards-based, continuous query execution across both event streams and persisted data stores like databases and high performance data grids. This enables the platform to act as the heart of intelligence for systems needing answers in microseconds or minutes to discern patterns and trends that would otherwise go unnoticed. Event Processing use cases require the speed of in-memory processing with the mathematical accuracy and reliability of standard database SQL. This platform queries listen to incoming event streams and execute registered queries continuously, in-memory on each event, utilizing advanced, automated algorithms for query optimization. While based on an in-memory execution model, however, this platform leverages standard ANSI SQL syntax for query development, thus ensuring accuracy and extensibility of query construction. This platform is fully compliant with the ANSI SQL '99 standard and was one of the first products available in the industry to support ANSI SQL reviewed extensions to standard SQL for real-time, continuous query pattern matching. The CQL engine optimizes the execution of queries within a processor leaving the developer to focus more on business logic rather than optimization.

The Oracle Stream Analytics platform allows for both SQL and Java code to be combined to deliver robust event processing applications. Leveraging standard industry terminology to describe event sources, processors, and event output or sinks, this platform provides a meta-data driven approach to defining and manipulating events within an application. Its developers use a visual, directed-graph canvas and palette for application design to quickly outline the flow of events and processing across both event and data sources. Developing the flow through drag and drop modeling and configuration wizards, the developer can then enter the appropriate metadata definitions to connect design to implementation. When necessary or preferred, with one click, developers are then able to drop into custom Java code development or use the Spring® framework directly to code advanced concepts into their application.

Event driven applications are frequently characterized by the need to provide low and deterministic latencies while handling extremely high rates of streaming input data. The underpinning of the Oracle Stream Analytics platform is a lightweight Java container based on an OSGi® backplane. It contains mature components from the WebLogic JEE application server, such as security, logging and work management algorithms, but leverages those services in a real-time event-processing environment. An integrated real-time kernel provides unique services to optimize thread and memory management supported by a JMX framework enabling the interaction with the container for performance and configuration. Web 2.0 rich internet applications can communicate with the platform using the HTTP publish and subscribe services, which enables them to subscribe to an application channel and have the events pushed to the client. With a small footprint this platform is a lightweight, Java-based container, that delivers faster time-to-production and lower total cost of ownership.

The Oracle Stream Analytics platform has the ability to handle millions of events per second with microseconds of processing latencies on standard, commodity hardware or optimally with Oracle Exalogic and its portfolio of other Engineered Systems. This is achieved through a complete "top-down" layered solution, not only with a design focus on high performance event processing use cases, but also a tight integration with enterprise-class real-time processing infrastructure components. The platform architecture of performance-oriented server clusters focuses on reliability, fault tolerance and extreme flexibility with tight integration into the Oracle Coherence technology and enables the enterprise to predictably scale mission-critical applications across a data grid, ensuring continuous data availability and transactional integrity.

In addition, this platform allows for deterministic processing, meaning the same events can be fed into multiple servers or the same server at different rates achieving the same results each time. This enables incredible advantages over systems that only rely on the system clock of the running server.

The techniques described above and below may be implemented in a number of ways and in a number of contexts. Several example implementations and contexts are provided with reference to the following figures, as described below in more detail. However, the following implementations and contexts are but a few of many.

In-Memory Stitching to Achieve Thousands of Database Updates Per Second

Embodiments of the present disclosure provide techniques for updating a database based on large numbers of incoming stream events, in parallel, in a distributed stream processing system.

In some examples, an organization may implement some organizational process that follows a defined flow. For example, the organizational process could include receiving an order via an online shopping service, an employee onboarding process, a new customer enrollment, etc. Using the disclosed system and methods, the organization may define the flow, and map a plan of the flow, including milestones and metrics. For example, for an online shopping service, the milestones may include receiving an order, processing the order, receiving and validating payment, etc. The metrics may include measures of successful completion of each of these milestones, the number of successful events per hour for each milestone, etc. Organizational users can use the disclosed system, e.g. via a cloud-based platform, to map and define such milestones and metrics associated with the organizational process. In an embodiment, such a cloud-based platform can handle multiple tenants with multiple, disparate process flows, multiple milestones per flow (e.g., 40 milestones per flow), etc.

In an embodiment, once the flow has been mapped and defined, the system can receive events pertaining to the milestones in a continuous event stream. The stream may contain thousands of events per second from multiple tenants. As disclosed herein, the system can engage in identifier (ID) federation to correlate events associated with the same milestone and/or flow. Subsequently, the disclosed system and methods can use in-memory stitching to update an underlying database efficiently, in order to incorporate data from these events as they arrive.

Using in-memory stitching as disclosed herein, the system can update the underlying database with thousands of incoming events per second, in parallel while avoiding exceptions such as optimistic locking faults. Accordingly, a dashboard user interface, e.g. a cloud-based interface, can display updated statistics pertaining to the milestones and metrics defined in the system flow. For example, the statistics may show aggregate numbers of successfully-completed and incomplete milestones, thereby measuring organizational performance, in real time. In an example, the dashboard may enable organizational users to determine whether such performance is satisfactory, for example as prescribed by a Service-Level Agreement (SLA). Using the disclosed system and methods, users can also determine, in real time, whether any problems threaten to disrupt the organization from meeting organizational objectives, an SLA, etc. Accordingly, the users can take timely remedial action, as necessary.

Example System for Processing Events and Updating a Database

FIG. 1 illustrates an example system 100 for updating a database in real time with incoming data from an event stream. Multiple users 102 from a plurality of tenants can use system 100 concurrently, for example via a cloud-based portal, to define milestones and metrics for measuring organizational processes. These organizational processes may generate continuous event streams producing many events, for example thousands of events per second. Moreover, multiple streams can include metrics from many tenants concurrently. In an embodiment, the disclosed system and methods can be used with thousands of incoming streams. For example, in some embodiments, the system may include ten servers executing ten integrations per server, for a total of 100 integrations concurrently. In some embodiments, the system may further process 400 organizational milestones per second, or 34.6 million milestones per day, on average. The system may process up to 103.7 million milestones per day, i.e. three times as many, under peak usage conditions, for example with three invocations per integration.

As the system receives new events, it can update the database 106 to incorporate information contained in the events. In particular, the system may update an existing record of database 106 based on a match of a unique identifier (ID) in the incoming event to an ID attribute of the existing record. Likewise, if the incoming event contains a new unique ID, the system may generate a new record in database 106. The system can populate the new record with attributes (a schema) based on data contained in the incoming event, as well as subsequent events with the same ID carrying additional data or metadata for the record. The system can update database 106 based on large numbers of incoming events efficiently using methods such as ID federation and in-memory stitching, as disclosed herein below. Moreover, the system can update database 106 in parallel, while avoiding exceptions such as optimistic locking faults that can frequently affect conventional systems.

In this example, users 102 can access the system via user devices 104, such as a tablet 104(1), a mobile phone, a client computer 104(N), etc. Users 102 may interact with system 100 to define milestones and metrics, to receive updated metric values from a database 106, to visualize the updated metrics, etc. Users 102 may interact with the system via a network 108, such as the Internet, a local- or wide-area network, an intranet, a virtual private network (VPN), wireless networks, cellular networks, and/or other private and/or public networks. In particular, the users 102 may interact with the system via a cloud-based portal or platform, which may be accessible over network 108. Accordingly, the disclosed system may receive large numbers of incoming events from multiple tenants, via the cloud and over network 108, and can update database 106 efficiently in parallel.

In various embodiments, the database 106 may be stored in a local storage, a remote storage, in a data center, in a networked file system, or any other storage, and is not limited by the present disclosure. The database 106 may include relational databases, Oracle database, Apache Hive, a data warehouse, SQL servers, or the like and may, in some examples, manage historical data, event data, relations, archived relations, or the like on behalf of the users 102. Additionally, the database 106 may receive or otherwise store data, such as data received from continuous event streams and/or processed by the stream ingestion computers 110. In some examples, the users 102 may utilize the user devices 104 to interact with the database 106 by providing queries (also referred to as "query statements") or other requests for data (e.g., historical event data, streaming event data, etc.). Further, in some examples, various computers and/or the database 106 may be part of an integrated, distributed environment.

Stream ingestion computers 110 may receive incoming events via one or more continuous event streams. The stream ingestion computers 110 may ingest, i.e., import, process, and/or parse the received events. The system may track events and correlate the incoming events to a unique identifier (e.g. invoice ID, order ID, instance ID, agent ID, etc.). In some embodiments, such an ID attribute may function as a key for the incoming events and/or for records of database 106. In some embodiments, the ingestion computers 110 may engage in identifier (ID) federation. That is, ingestion computers 110 may determine whether a respective received event has an ID attribute equal to an ID attribute of a previously received event, and if so, they can associate the new event with the previously received event. This may also be referred to as wiring or stitching together the events with the same ID attribute. In an embodiment, ID federation may be a pre-processing step that occurs prior to in-memory stitching, as disclosed herein below.

One or more integration computers 112 may receive messages containing the events via different delivery channels and/or stream processing systems (e.g. REST, JMS, Kafka), and may update database 106 to incorporate information included in these events. In an example, the stream may include thousands of events per second from multiple streams, each carrying multiple events. Moreover, the system is capable of being used with multiple tenants. In some embodiments, integration computers 112 can use in-memory stitching to update database 106 fast and efficiently, so as to handle large numbers of incoming events from multiple tenants, as disclosed herein. Using the disclosed system and methods, integration computers 112 can process the incoming events, in order to update database 106, using multiple processors and/or computers in parallel, and can avoid exceptions introduced by conventional parallel systems, such as optimistic locking faults. In an embodiment, the disclosed system and methods can be used with thousands of incoming streams. For example, in an embodiment, the system may include ten servers executing ten integrations per server, for a total of 100 integrations concurrently. In some embodiments, the system may further process 400 organizational milestones per second, or 34.6 million milestones per day, on average. The system may process up to 103.7 million milestones per day, i.e. three times as many, under peak usage conditions, for example with three invocations per integration.

In one illustrative configuration, the integration computers 112 may include at least one memory 114 and one or more processing units (or processor(s)) 136. The processor(s) 136 may be implemented as appropriate in hardware, computer-executable instructions, firmware, or combinations thereof. Computer-executable instruction or firmware implementations of the processor(s) 136 may include computer-executable or machine-executable instructions written in any suitable programming language to perform the various functions described.

The memory 114 may store program instructions that are loadable and executable on the processor(s) 136, as well as data generated during the execution of these programs. Depending on the configuration and type of service provider computers 106, the memory 114 may be volatile (such as random access memory (RAM)) and/or non-volatile (such as read-only memory (ROM), flash memory, etc.). The service provider computers 106 or servers may also include additional storage 138, which may include removable storage and/or non-removable storage. The additional storage 138 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 114 may include multiple different types of memory, such as static random access memory (SRAM), dynamic random access memory (DRAM), or ROM.

The memory 114, the additional storage 138, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 114 and the additional storage 138 are all examples of computer storage media.

The service provider computers 106 may also contain communications connection(s) 140 that allow it to communicate with a stored database, another computing device or server, user terminals, and/or other devices on the networks 108. The service provider computers 106 may also include input/output (I/O) device(s) 142, such as a keyboard, a mouse, a pen, a voice input device, a touch input device, a display, one or more speakers, a printer, etc.

Turning to the contents of the memory 114 in more detail, the memory 114 may include an operating system 116 and one or more application programs or services for implementing the features disclosed herein. In an embodiment, the memory 114 may include an in-memory record stitching module 118 configured to incorporate information from large numbers of incoming stream events and update database 106 based on this information. In an embodiment, the in-memory record stitching module 118 may include one or more modules such as an event receiving module 120, a record expanding module 122, a record combining module 124, a trigger receiving module 126 and a database updating module 128 to implement the event processing services described herein. As used herein, modules may refer to programming modules executed by servers or clusters of servers that are part of a service. In this particular context, the modules may be executed by the servers or clusters of servers that are part of the integration computers 112. In an embodiment, event receiving module 120 can receive a plurality of events, for example, from stream ingestion computers 110 via Apache Kafka. The plurality of events can correspond to a time interval of a watermark. Record expanding module 122 can load the events into a staging area of memory 114, such as in-memory records 130. Record combining module 124 can identify that a number of these events, e.g., the expanded events in in-memory records 130, share a value of a key attribute, e.g., an ID attribute. Record combining module 124 can then generate an in-memory combined database record (e.g., in-memory records 130) comprising attribute information from these events and the value of the key attribute, as disclosed herein below. Trigger receiving module 126 can receive a trigger signal. In response to the trigger signal, database updating module 128 can transmit, to a database manager (not shown), a single message to update database 106.

Figure 2:
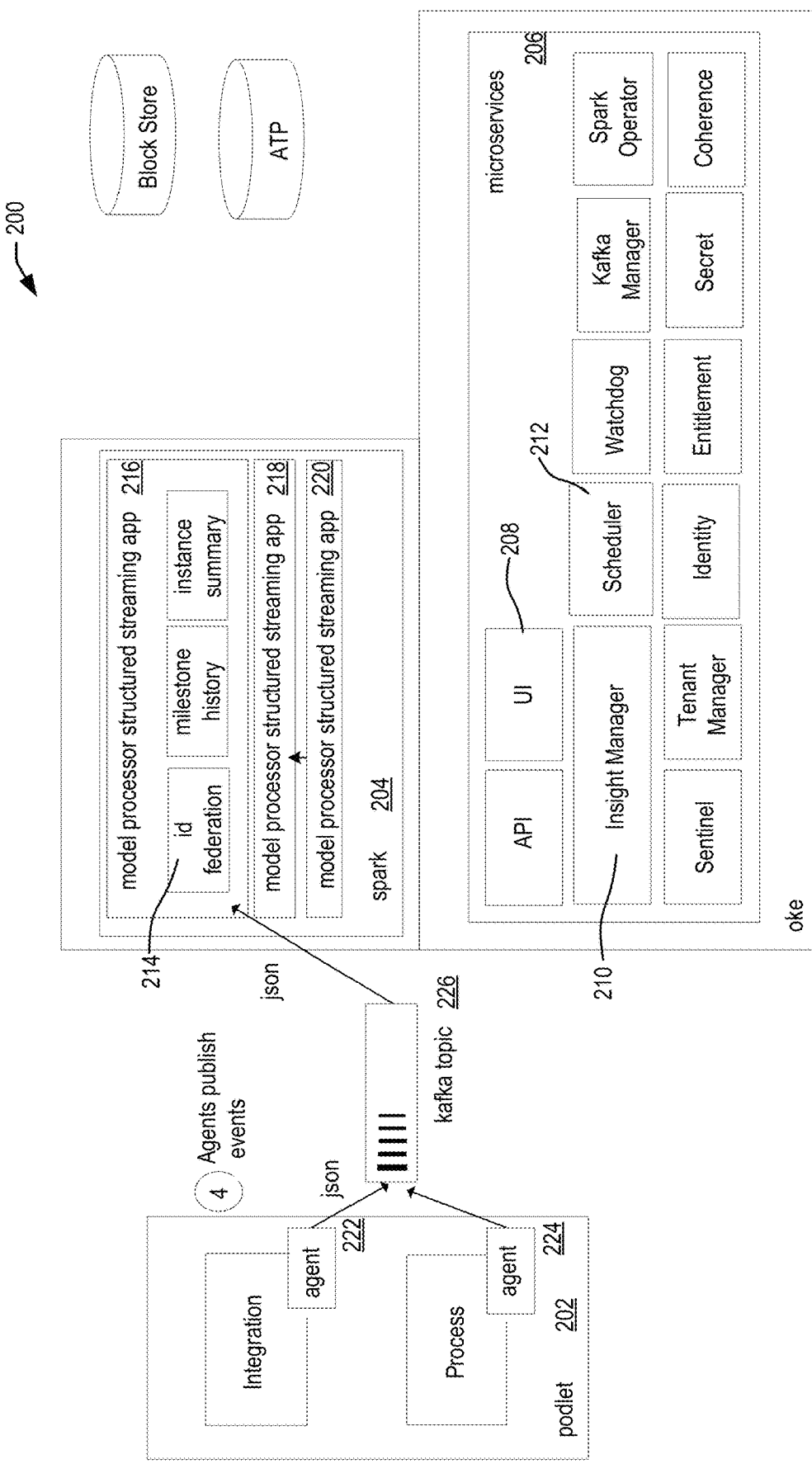
FIG. 2 is a block diagram illustrating an architecture of an example system for integrating and processing incoming data from an event stream and updating a database in real time.

FIG. 2 is a block diagram illustrating an architecture of an example system 200 for integrating and processing incoming data from an event stream and updating a database in real time. In this example, system 200 includes several podlets 202, Apache Spark app modules 204, and microservices 206. For example, microservices 206 can include microservices such as a user interface (UI) 208, a visual insight manager 210, a scheduler 212, an Apache Kafka manager, an Apache Spark operator, a tenant manager, Oracle Coherence, and the like. In an example, the visual insight manager may include Oracle Insight. Apache Spark app modules 204 can include ID federation 214, milestone history, instance summary, and model processor structured streaming apps 216, 218, and 220. Podlets 202 can include an integration agent 222 and a process agent 224.

In an embodiment, users may use the UI 208 to design a model, which may include setting milestones defining a business process, and/or metrics to measure progress along the milestones, as described herein below. The users may further assign the model to an implementation and/or activate the model via the UI 208. The UI 208 may include a cloud-based portal or platform. For example, the cloud-based portal or platform may include Oracle Insight. In an example, the cloud-based portal or platform may be implemented via Cloud Native Computing Foundation's Kubernetes or a similar application deployment or orchestration system. Alternatively, the UI 208 may include another client application, a servlet, a directly executed UI, or any other type of UI, and is not limited by the present disclosure. The users may include business analysts, integration architects, business executives, and/or administrators. In particular, business analysts and business executives may generate reports on the current status of the metrics and milestones, while integration architects may design the milestones, metrics, reports, and/or dashboards that display such results.

When the model has been defined, the scheduler microservice 212 may then assign the model to be processed by a model processor, such as model processor structured streaming apps 216, 218, and 220. For example, the model processor structured streaming app may be implemented within Apache Spark, or another cluster computing platform. In an embodiment, processing the model may include determining when the organizational process milestones occur and/or determining up-to-date values of the metrics. Processing the model may further include generating, transmitting, and/or receiving events in the event stream to represent updates to the milestones and/or metrics.

The visual insight manager microservice 210 may then publish the updates to the milestones and/or metrics as events in the event stream. In particular, the visual insight manager microservice 210 may send events to an integration agent 222, which may be a podlet. The visual insight manager microservice 210 and/or the podlets 202 may be implemented via Cloud Native Computing Foundation's Kubernetes or a similar application deployment or orchestration system.

Agents, such as the integration agent 222 and/or process agent 224, may then publish the events. This may include sending the events to an Apache Kafka topic 226. From the Apache Kafka topic 226, the events may be sent for event processing, for example to a model processor structured streaming app, such as apps 216, 218, and 220. For example, the model processor structured streaming app may be implemented within Apache Spark, or another cluster computing platform.

In an embodiment, the model processor structured streaming app 216 may initially perform ID federation 214. Such ID federation 214 may be a pre-processing step that occurs prior to the main event processing steps, for example prior to the event undergoing in-memory stitching. In particular, the model processor app 216 may perform ID federation 214 before the event enters an in-memory stitching app. Specifically, during ID federation 214, the model processor structured streaming app may determine that an incoming event has the same ID attribute as a previous event. When the incoming event arrives from integration, the model processor structured streaming app 216 can correlate the incoming event's ID attribute with the previous event's ID, and accordingly can connect, or "wire," the events together.

In an embodiment, one ID can be mapped to many implementations or integrations, which can all be wired together to a single business model. Thus, ID federation can enable separate flows to be connected, or "wired" together, based on their identifiers. Accordingly, a single dashboard UI can provide data across multiple integrations.

Additional model processor structured streaming apps may then perform additional event processing. For example, a model processor structured streaming app may perform in-memory stitching of records based on the data in the events, as described herein below. In various embodiments, model processor structured streaming apps may determine a milestone history and/or an instance summary. The system may also perform other model processing steps and/or procedures, and is not limited by the present disclosure.

Figure 3:
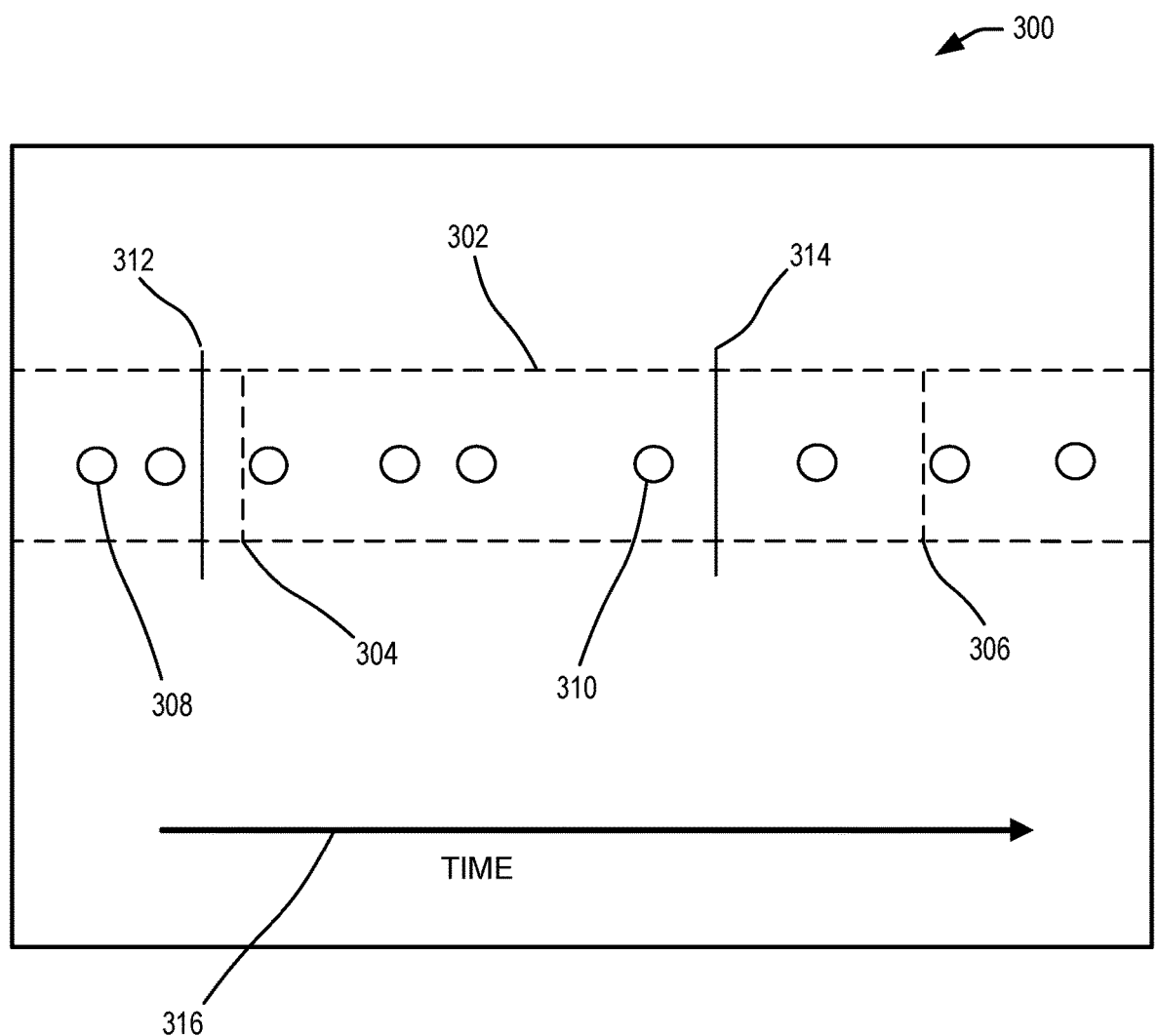
FIG. 3 shows an example watermark time interval with watermarks, a continuous event stream, and a trigger signal.

FIG. 3 shows an example watermark time interval 302 with watermarks 304 and 306. In this example, events, such as event 308 and event 310, of a continuous event stream, arrive and are stored in a staging area, or in-memory buffer, until the watermark discards them. In an embodiment, the watermark, such as watermark 306, may discard the events stored in a staging area, or in-memory buffer, after the watermark time interval 302 passes. Alternatively, the watermark may separately expire and/or discard each individual event when it becomes older than the watermark time interval 302. The watermark time interval 302 may be longer than a trigger interval associated with trigger signals 312 and 314. The trigger interval may be a time interval between trigger signals 312 and 314, wherein the trigger signals determine when the underlying database is updated using the in-memory records currently present in the staging area.

In the example of FIG. 3, the events are shown arranged along time axis 316 according to their arrival times and/or timestamps. In this example, event 308 precedes watermark 304, and therefore is discarded by watermark 304 before trigger signal 314. However, in this example, event 308 is present in the buffer at the time of trigger signal 312, and therefore can be incorporated into the database during an update triggered by signal 312. By contrast, the event 310 arrives during watermark time interval 302. In particular, event 310 arrives after watermark 304 and before both watermark 306 and trigger signal 314. Thus, event 310 can be incorporated into the database during an update triggered by signal 314.

In an embodiment, the system may discard any events currently present in the in-memory buffer when a watermark occurs. In another embodiment, each event may include a timestamp, which can be used to compare to the time of the watermark. In such an example, the watermark can use the events' timestamp values. Alternatively, the watermark can use processing time, i.e., time measured by a machine that processes the event, for the event timestamps. The watermark may compare such event timestamps to a current system time.

In-Memory Stitching

Figure 4:
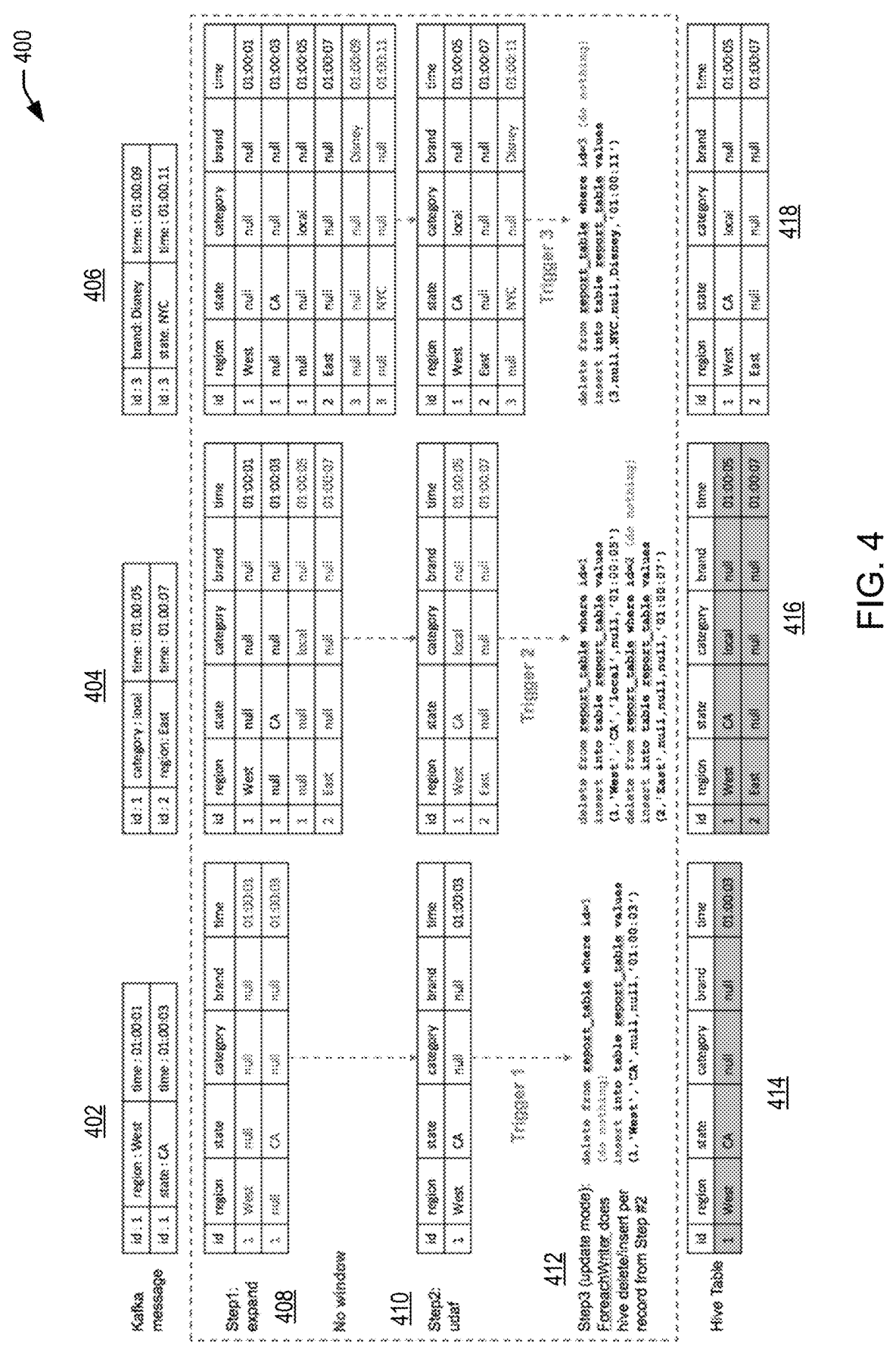

FIG. 4 illustrates an example of in-memory stitching 400 of incoming data from an event stream to update a database, in accordance with an embodiment of the present disclosure. In a first step, the system can receive messages from a stream-processing platform containing events of a continuous stream. For example, the stream-processing platform may be Apache Kafka, REST, JMS, or another stream-processing platform. In some embodiments, the stream may include events arriving via multiple delivery channels, e.g., several stream-processing platforms concurrently. Usually, the unique ID translates to a new row in a database (e.g., Oracle database or Hive) with columns (a schema) which are populated by the subsequent events (i.e. each subsequent event carries a few more pieces of meta data on the same record). In an example, the stream may include thousands of events per second from multiple streams, each carrying multiple events with different IDs. Moreover, the system is capable of being used with multiple tenants.

In this example, three messages 402, 404, and 406 arrive containing events. In an embodiment, multiple events may be contained in the messages, such as two events per message, or any number of events per message, and are not limited by the present disclosure. In this example, the events can include timestamp values. For example, message 402 contains an event with timestamp 1:00:01, and one with timestamp 1:00:03, message 404 contains two events with timestamps 1:00:05 and 1:00:07, and message 406 contains two events with timestamps 1:00:09 and 1:00:11. Such timestamps may be used, e.g., to compare to a watermark interval. Alternatively, the system may associate a processing time with the events (i.e., time measured by a computing node, processor, or device that processes the event).

In some embodiments, a respective event may contain only partial data pertaining to a record of the database, and multiple events may be combined to provide a full record. Likewise, in some embodiments, a respective event may modify attributes of an existing event. Accordingly, each event in the messages can include a record identifier (ID) that specifies a unique record to which the event pertains. This ID attribute may be used as a key to refer to the records, for example when the system, or a database manager, creates, modifies, or deletes the records based on the information in the events.

As in the example of FIG. 3, the system may make use of a watermark with a watermark time interval while receiving the events. In particular, all events and/or in-memory records in the buffer or staging area of memory may be discarded after the watermark time interval passes. In an embodiment, all the events may be discarded at regular intervals equal to the watermark time interval. Alternatively, events may be continuously discarded when they become older than the watermark time interval. In an embodiment, the system also uses a trigger signal at regular trigger intervals to determine when to update the underlying database based on the in-memory records. The watermark time interval can be longer than the trigger interval, to ensure that the trigger signal occurs at least once during each watermark time interval.

In a second step, the system can expand 408 the events in the messages. By manipulating the incoming events' data in memory, the disclosed system and methods can access and organize the data faster than in the database, which in some embodiments may be stored in permanent storage. In particular, the disclosed system and methods can greatly reduce the number of database calls (e.g., JDBC calls) needed to update the database based on thousands of incoming events per second in the continuous stream.

In this example, expanding 408 the events results in one expanded event, also referred to as an in-memory record or an aggregate buffer, for every event in the messages. Accordingly, in this step, there can be more than one in-memory record for a respective database record keyed by a respective ID. For example, message 402 can be expanded into two in-memory records, one for each event in message 402. In an embodiment, expanding 408 each respective event inserts all the attributes included in the respective event into the in-memory record, and fills in the remaining attributes with "Null" or empty values. In an embodiment, when the system updates a database with the values contained in the incoming events, as in step 412 below, the corresponding column value is only updated if the new value is not "Null."

In this example, the first in-memory record has an ID attribute of 1, a region attribute of "West," and a time of 1:00:01. Since the corresponding first event in message 402 contains no other data, the first in-memory record's remaining attributes are "Null" or empty. Similarly, the second event in message 402 is expanded into an in-memory record with an ID attribute of 1, a state attribute of "CA," and a time of 1:00:03, with the remaining attributes "Null." Since both of these events have ID attribute of 1, the system can expand 408 the events into two in-memory records with the same event ID.

In this example, there is no inconsistency between the state and region attributes of the two events, since each of these attributes is only defined in one event of message 402. But note that, in some cases, there can be inconsistencies among the attributes defined in a single message received by the system, or in subsequent messages. For example, in message 402, the time attributes of the two events differ.

Likewise, messages 404 and 406 can each be expanded into two in-memory records. As mentioned above, in some cases, there can be inconsistencies among the attributes defined in a single message received by the system, or in subsequent messages. For example, in message 404, the first event has ID attribute of 1, category attribute of "local," and a time of 1:00:05. Thus, this event's time differs with the time of the previously-loaded in-memory record. In another example, another attribute, such as the category, region, state, or brand, could differ with the previously-loaded record. In such a situation, the system may adopt the attribute belonging to the event that is received latest or has the latest timestamp, or may use some other method to determine which attribute to adopt, and is not limited by the present disclosure.

In a third step, the system can apply 410 a custom function, such as a User Defined Aggregation Function (UDAF). For example, the UDAF can combine all the in-memory records with a respective ID value into a single in-memory record. This step may also be referred to as in-memory stitching, or simply stitching, of the incoming events into the combined or consolidated in-memory record. Because the disclosed system and methods have the ability to manipulate this in-memory record before updating the database, the disclosed system and methods can operate faster and more efficiently than conventional systems, by reducing the number of database accesses. This can further prevent exceptions such as optimistic locking faults.

In this example, both events included in message 402 have an ID value of 1. Thus, UDAF 410 can incorporate both of these events into a single in-memory record, which also has the ID value 1. In this example, the resulting in-memory record contains the attributes from both of these events, as well as "Null" values for any attributes not specified in either of the received events. As described above, there is no inconsistency between the state and region attributes of the two events in message 402, so the system can combine, or stitch, both of these attributes together into the in-memory record.

But note that, in some cases, there can be inconsistencies among the attributes defined in a single message received by the system, or in subsequent messages. In such a situation, the system may adopt the attribute belonging to the event that is received latest or has the latest timestamp, or may use some other method to determine which attribute to adopt, and is not limited by the present disclosure. In this example, the time attributes of the two events of message 402 do differ. Accordingly, during stitching, the system can set the time attribute in the in-memory record to 1:00:03, which is equal to the latest timestamp among the events in message 402 with ID value of 1.

Furthermore, in this example, message 404 includes two events with different ID attributes, 1 and 2. As a result, the system can apply 410 the UDAF to incorporate these respective events into separate in-memory records corresponding to ID values 1 and 2. In the case of the first event of message 404, the ID value of 1 corresponds to the same in-memory record previously generated for the events in message 402. In this example, the first event in message 404 has a category attribute with the value "local," which once again poses no inconsistency with the existing in-memory record with ID of 1 (i.e., the category attribute differs from the attributes contained in the events of message 402). Accordingly, in applying 410 the UDAF, the system can add this attribute to the in-memory record, for example by changing the "Null" value to "local." However, the timestamp of this event is 1:00:05, which is later than the existing timestamp of 1:00:03 in the in-memory record. Accordingly, in applying 410 the UDAF, the system can change the time attribute in the in-memory record to 1:00:05.

In the case of the second event of message 404, the system can generate a new in-memory record with ID attribute of 2, region attribute of "East," time attribute of 1:00:07, and with the remaining attributes "Null."

Finally, in this example, message 406 includes two events with ID attributes of 3, different from any of the ID values in messages 402 and 404. As a result, the system can apply 410 the UDAF to combine the data from these two events of message 406 into one in-memory record, with the ID value 3.

In another example, columns of the in-memory records can be updated in memory in parallel using the UDAF as new events arrive. In particular, the UDAF may either insert new in-memory records, or update existing in-memory records, based on the information in the new incoming events.

In a fourth step, the system can update 412 the in-memory records into a database. At the end of a configurable time period (a trigger interval, e.g. 10 seconds or 30 seconds) the system writes any modified in-memory records to the Oracle Database (DB) or Hive (or any other stores). This updating 412 may occur in response to receiving a trigger signal. The watermark time interval may be longer than the trigger interval, so that the trigger signal may occur at least once between any two watermarks. This batch of records is written to the database using a single prepared statement with all the records from the batch bound to it. In an embodiment, the corresponding column value is only updated if the new value is non-null. This greatly reduces the number of database connections and I/O. For example, the statement can be a Java Database Connectivity (JDBC) or Hive call.

The in-memory stitching 400 may include a hivetable 414 and include an ID value, region attribute of "West," state attribute of "CA," and null values for a category attribute and a brand attribute. The time attribute may correspond to the latest timestamp among the events in message 402 with ID value of 1 (here, "1:00:03").

The in-memory stitching 400 may also include a hivetable 416. The hivetable 416 may include first entry with an ID value of 1, a region attribute of "West," a state attribute of "CA," a category attribute of "local," and a brand attribute of "null." The time attribute may correspond to the latest timestamp among the events in message 404 with ID value of 1 (here, "1:00:05"). The hivetable 416 may also include a second entry with an ID value of 2, a region attribute of "East," a state attribute of "null," a category attribute of "null," and a brand attribute of "null." The time attribute may correspond to the latest timestamp among the events in message 404 with ID value of 2 (here, "1:00:07").

The in-memory stitching 400 may also include a hivetable 418. The hivetable 418 may include first entry with an ID value of 1, a region attribute of "West," a state attribute of "CA," a category attribute of "local," and a brand attribute of "null." The time attribute may correspond to the latest timestamp among the events in message 406 with ID value of 1 (here, "1:00:05"). The hivetable 416 may also include a second entry with an ID value of 2, a region attribute of "East," a state attribute of "null," a category attribute of "null," and a brand attribute of "null." The time attribute may correspond to the latest timestamp among the events in message 406 with ID value of 2 (here, "1:00:07").

In the case of the Oracle database, the system may use a single database MERGE statement. The MERGE statement may be a single JDBC call that inserts the record if it does not exist, or updates the record if the record does already exist. In an example, the MERGE statement may be formatted as follows:

MERGE INTO ESM
  SVCINSTANCE_11.OPPORTUNITYTOORDER A
  USING DUAL ON (A.INSTANCEID=?)
  WHEN MATCHED THEN UPDATE
    SET EVENTTIME=NVL(?,A.EVENTTIME),
      MODEL=NVL(?,A.MODEL),
      MILESTONE=NVL(?,A.MILESTONE),
      REGION=NVL(?,A.REGION),
      SALESORGANIZATION=NVL(?,A.SALESOR-
        GANIZATION),
      PRODUCTNAME=NVL(?,A.PRODUCT-
        NAME),
      REASONFORQUOTEREJECT=NVL(?,A.REA-
        SONFORQUOTEREJECT),
      REASONFORREJECTIONBY=NVL(?,A.REA-
        SONFORREJECTIONBY),
      OPPORTUNITYAMOUNT=NVL(?,A.OPPOR-
        TUNITYAMOUNT),
      DISCOUNT=NVL(?,A.DISCOUNT),
      TOTALQUOTEAMOUNT=NVL(?,A.TO-
        TALQUOTEAMOUNT),
      NETQUOTEAMOUNT=NVL(?,A.NET-
        QUOTEAMOUNT),
      APPROVEDDISCOUNT=NVL(?,A.AP-
        PROVEDDISCOUNT),
      TOTALORDERAMOUNT=NVL(?,A.TOTA-
        LORDERAMOUNT)
  WHEN NOT MATCHED THEN INSERT
    (EVENTTIME,
    INSTANCEID,
    MODEL,
    MILESTONE,
    REGION,
    SALESORGANIZATION,
    PRODUCTNAME,
    REASONFORQUOTEREJECT,
    REASONFORREJECTIONBY,
    OPPORTUNITYAMOUNT,
    DISCOUNT,
    TOTALQUOTEAMOUNT,
    NETQUOTEAMOUNT,
    APPROVEDDISCOUNT,
    TOTALORDERAMOUNT)
    VALUES (?,?,?,?,?,?,?,?,?,?,?,?,?,?,?)

Since these in-memory records are structured such that that no competing updates occur on the same row, these DB operations can be executed quickly. In an example benchmark, the disclosed system and methods can ingest and process thousands of records per second, and can furthermore avoid any database exceptions, such as optimistic locking faults. Thus, in-memory stitching may significantly speed up the process of incorporating information from incoming events into the database.

In some embodiments, both ID federation, as in the example of FIG. 2, and in-memory stitching may connect information contained in separate events, but having the same ID attribute, to a single database record with the ID attribute. However, ID federation may occur earlier, i.e., before in-memory stitching occurs. In particular, in a multi-tenant (MT) configuration, multiple tenants can push data to a single cloud back-end system for processing. In an embodiment, a user can use a cloud user interface (UI) to set up ID federation before the in-memory stitching is able to process the incoming data properly in the back-end. This ID federation can ensure that the system can properly handle data arriving from multiple workflows, tenants, and/or systems based on their IDs. In an example, events belonging to a single transaction can be wired together in memory using ID federation and stitching.

Figure 5A:
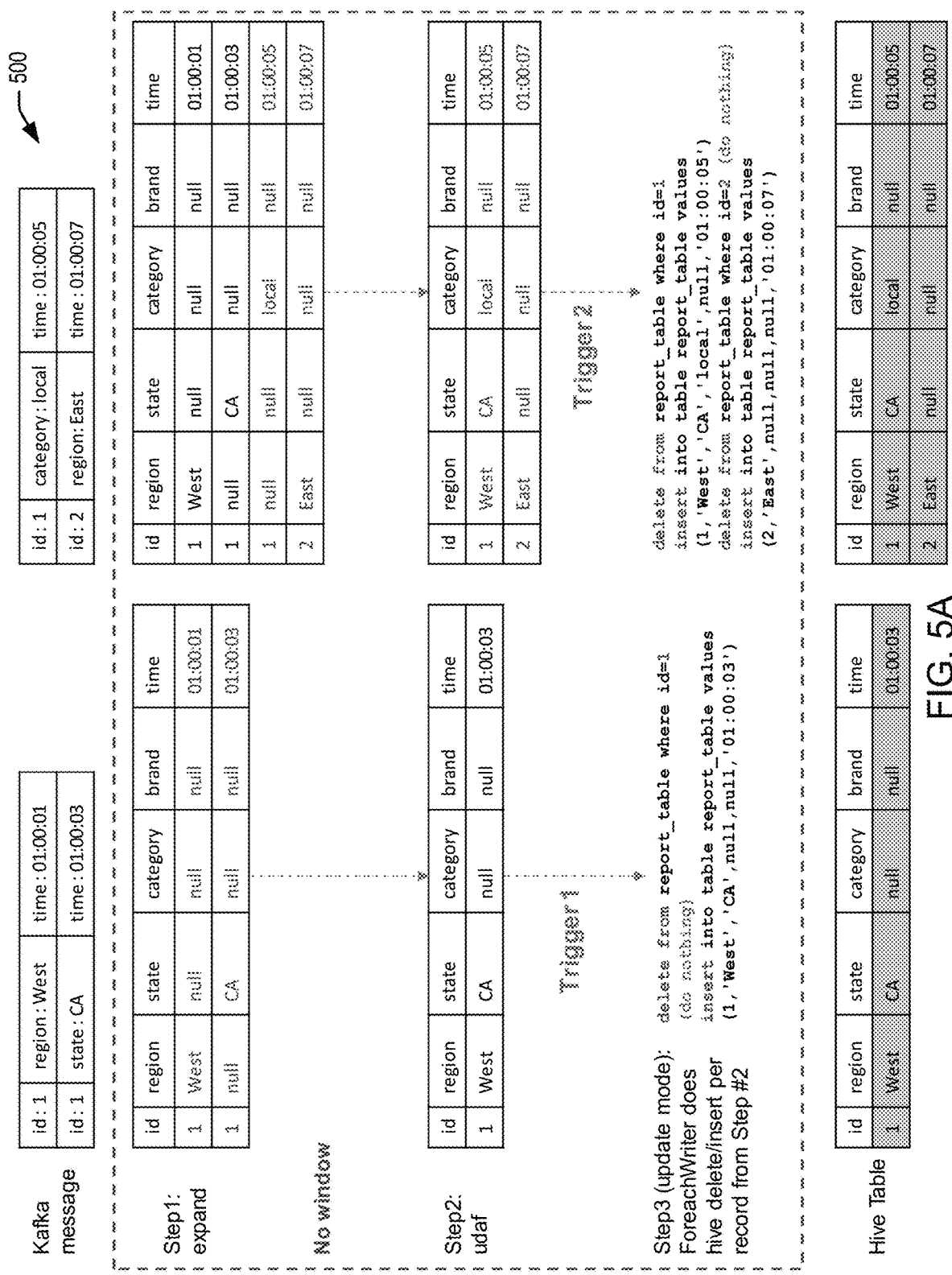
FIG. 5A illustrates an example of in-memory stitching of incoming data from an event stream to update a database, in accordance with an embodiment of the present disclosure.

FIG. 5A illustrates an example of in-memory stitching of incoming data 500 from an event stream to update a database, in accordance with an embodiment of the present disclosure.

Figure 5B:
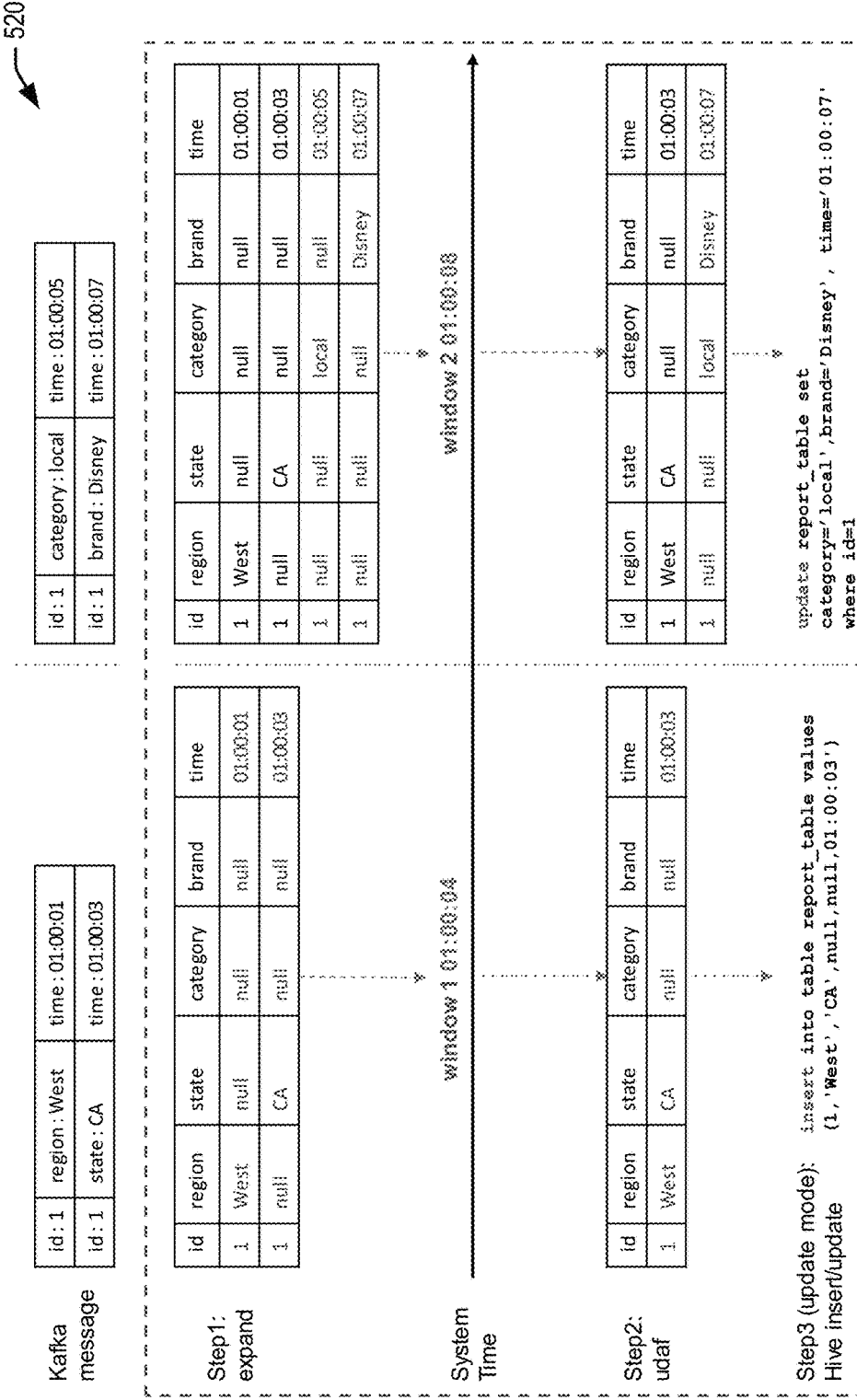
FIG. 5B illustrates an example of in-memory stitching of incoming data from an event stream to update a database using a time window, in accordance with an embodiment of the present disclosure.

FIG. 5B illustrates an example of in-memory stitching of incoming data 520 from an event stream to update a database using a time window, in accordance with an embodiment of the present disclosure. In this example, the system can use a time window to select the events to be loaded into the staging area of memory. These events are then expanded into in-memory records, and the in-memory records are used to update the underlying database.

Figure 5C:
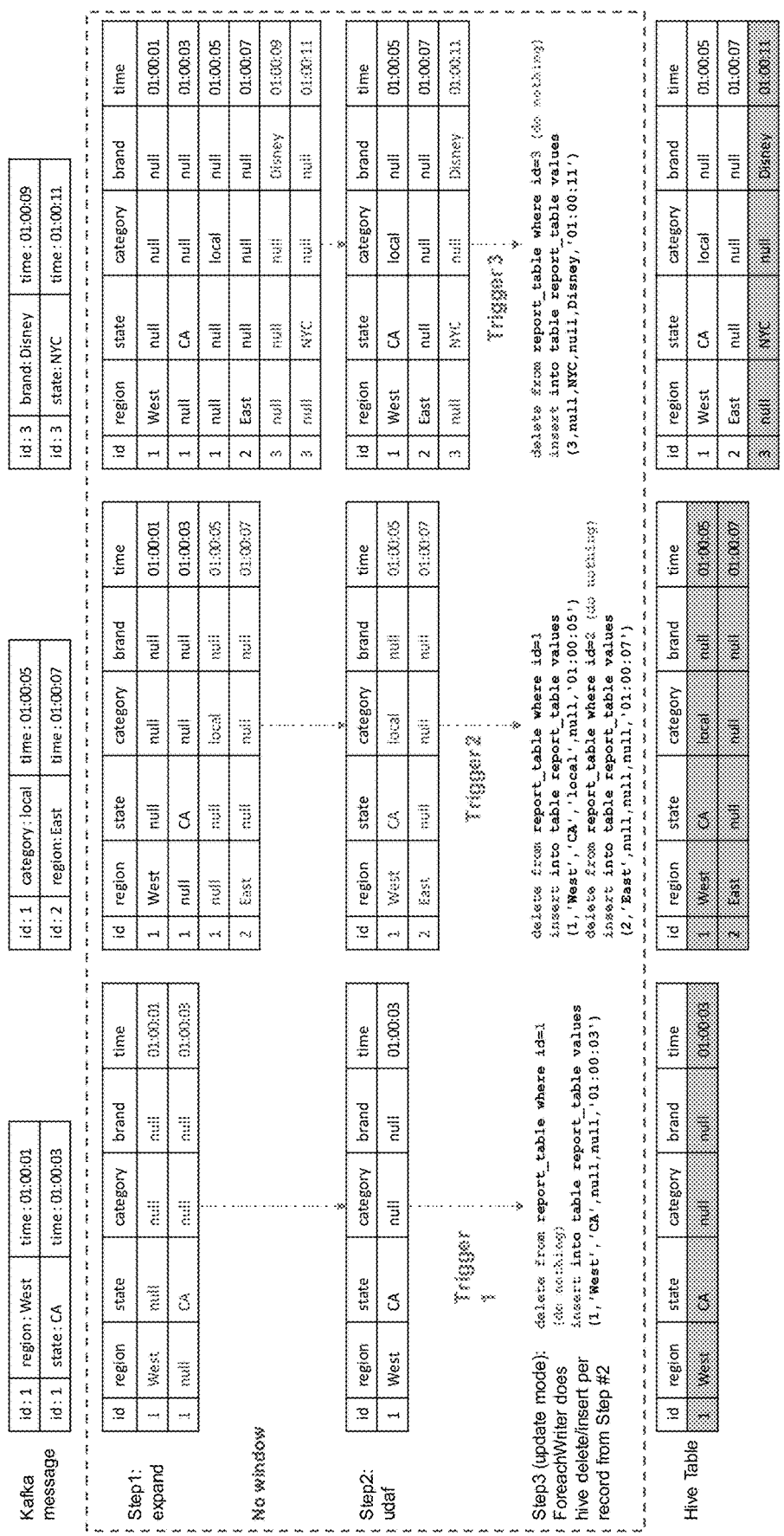
FIG. 5C illustrates an example of in-memory stitching of incoming data from an event stream to update a database using delete and insert database statements, in accordance with an embodiment of the present disclosure.

FIG. 5C illustrates an example of in-memory stitching of incoming data 550 from an event stream to update a database using delete and insert database statements, in accordance with an embodiment of the present disclosure. In this example, when updating the database, the system can use delete statements to remove existing database records with the same ID values as the in-memory records. The system can then use insert statements to update the database with the data in the in-memory records.

Figure 5D:
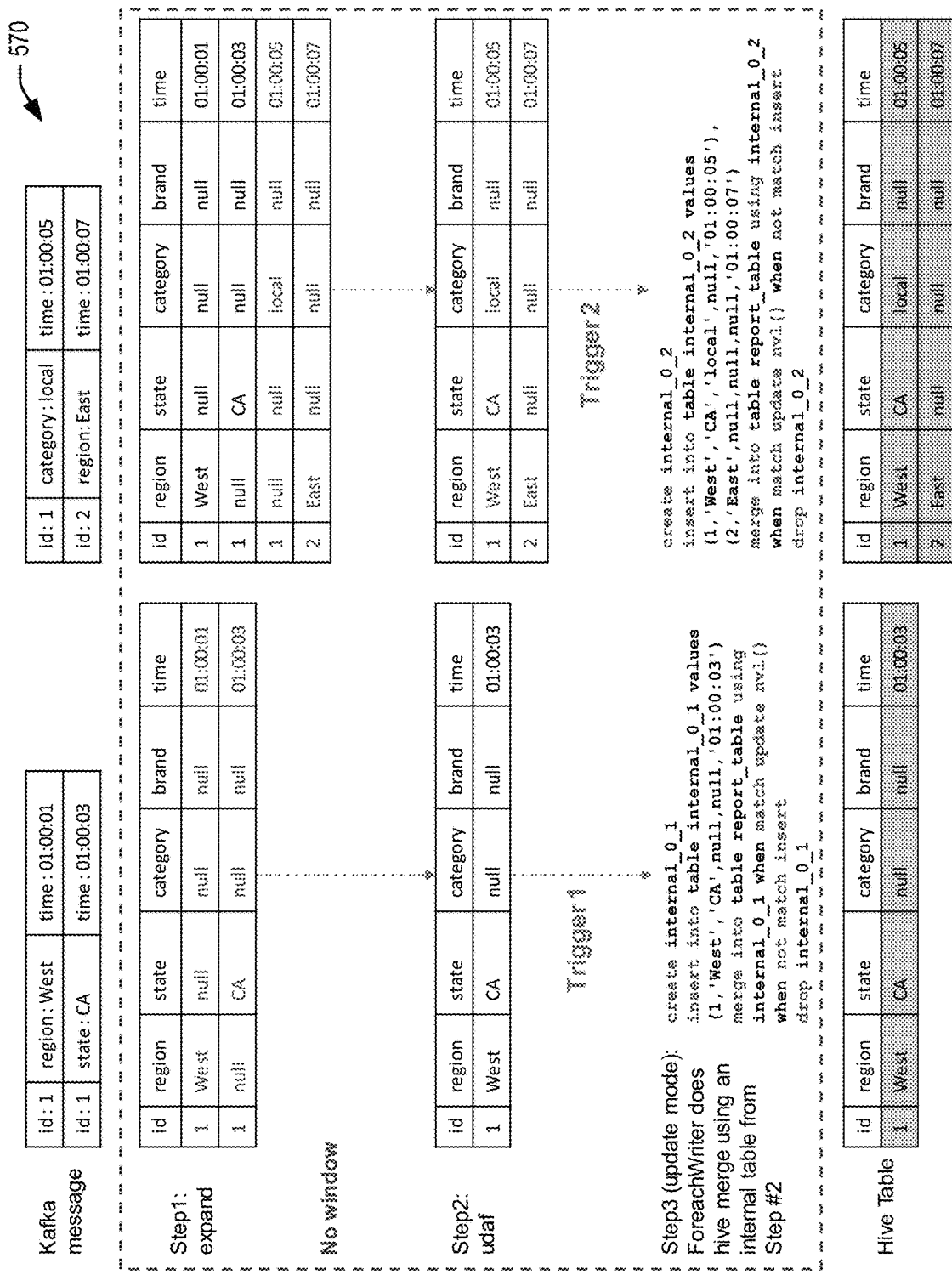
FIG. 5D illustrates an example of in-memory stitching of incoming data from an event stream to update a database using merge database statements, in accordance with an embodiment of the present disclosure.

FIG. 5D illustrates an example of in-memory stitching of incoming data 570 from an event stream to update a database using merge database statements, in accordance with an embodiment of the present disclosure. In this example, when updating the database, the system can use merge statements to insert a new record in the database with the ID value of the in-memory record if it does not exist, or update the record in the database with the ID value if such a record does already exist.

User Interfaces for Designing and Displaying a Model

Figure 6A:
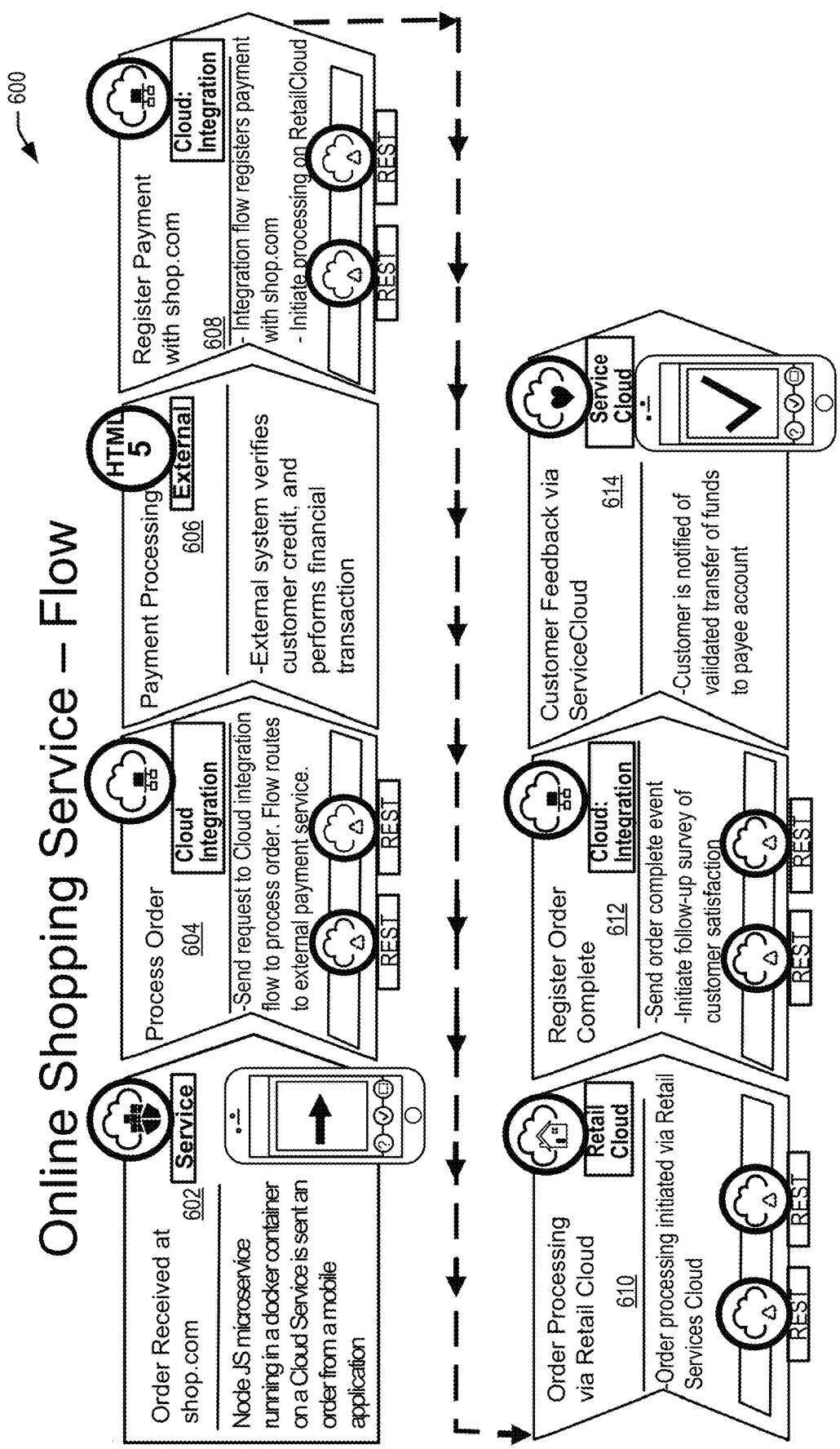
FIG. 6A illustrates an example flow plan including milestones for an organizational process, in accordance with an embodiment of the present disclosure.

FIG. 6A illustrates an example flow plan 600 including milestones for an organizational process, in accordance with an embodiment of the present disclosure. In this example, the organizational process involves receiving an order for an online shopping service. Such an organizational process flow may also be referred to as an integration or a model. The disclosed system and methods can map and define the milestones of flow 600, track the occurrence of milestones throughout flow 600, generate events representing the occurrence of the milestones, update a database using the generated events, and display metrics and statistics from the updated database in real time in a cloud-based dashboard user interface (UI).

In flow plan 600, first an order is received 602 at an online shopping service, such as shop.example.com. The shopping service may be implemented as a microservice within a container, such as a Docker container, in a Container Cloud service. In various examples, the order may originate from a mobile application, from another online source, or from a telephone or in-store order. Next, the order can be processed 604 by an integration flow. For example, the integration flow can route the order to an external payment processing service. Next, the payment can be processed 606. For example, the external service can verify a credit card or other form of payment, and perform a financial transaction. The payment can then be registered 608. For example, the integration flow can register the payment with the online service at shop.example.com. In an example, the online shopping site can initiate order processing via a Retail Cloud service. Next, the online shopping site can process the order 610, for example via the Retail Cloud service. In an example, processing the order may include checking inventory, setting a shipment date, shipping the order, etc. The system can then register the order complete 612. For example, the system may publish and/or transmit an event, which sets a flag marking the order as completed. In another example, the system may initiate a follow-up survey of customer satisfaction. Finally, the system can perform customer feedback 614, for example to notify the customer that the payment has completed. In an embodiment, a user can define each of these steps of flow 600 using the disclosed user interface (UI), as in the examples of FIGS. 6B, 6C, and 6D below.

Figure 6B:
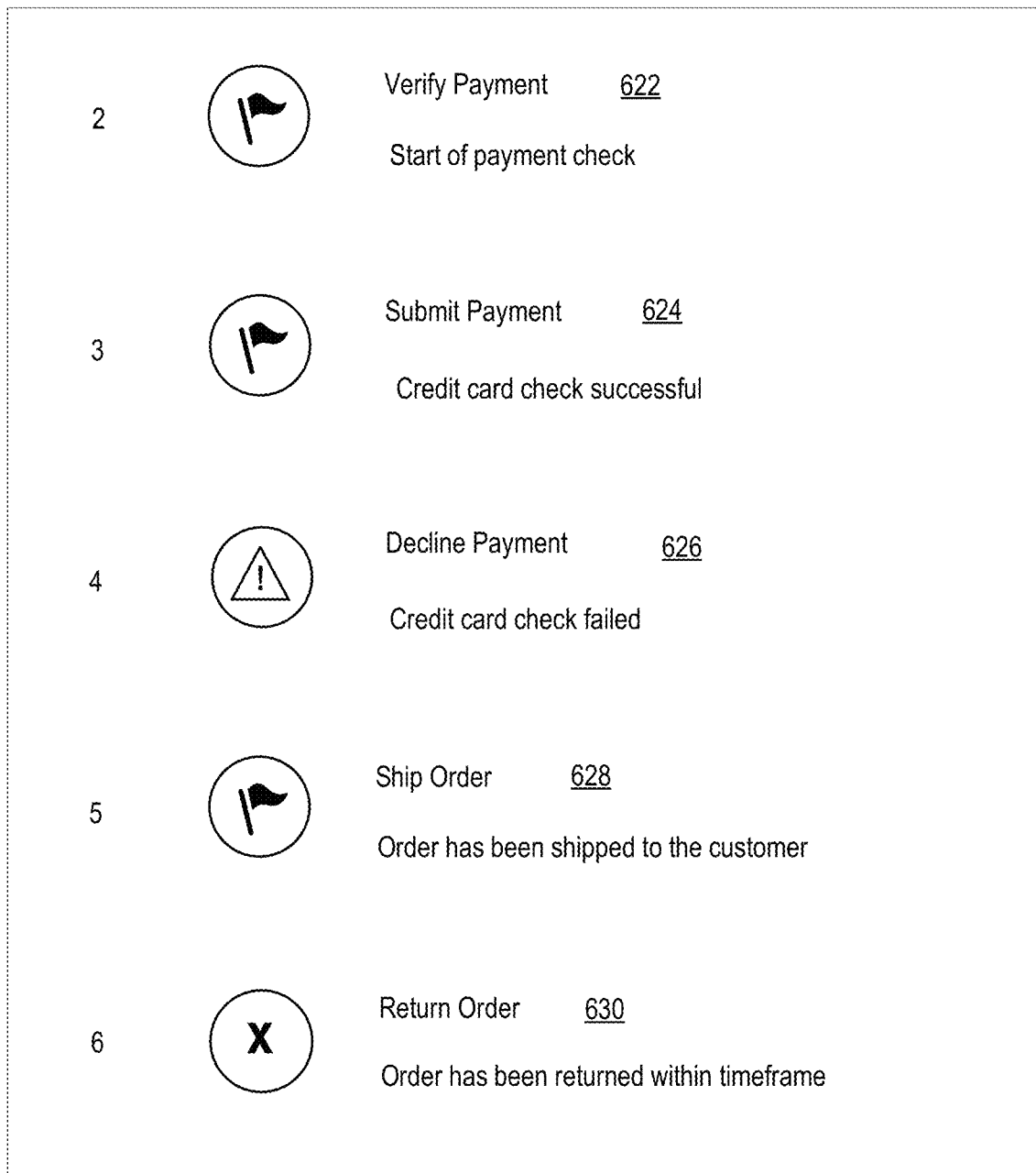
FIG. 6B illustrates an example user interface view for defining milestones of an organizational process, in accordance with an embodiment of the present disclosure.

FIG. 6B illustrates an example user interface (UI) view 620 for defining milestones and mapping a flow of an organizational process, in accordance with an embodiment of the present disclosure. In particular, a user can define each of the steps of flow 600 in the example of FIG. 6A as a milestone, e.g. using the UI 620.

In an embodiment, UI 620 may be a cloud-based interface, for example accessible via a web browser from an Internet site, an intranet page, a virtual private network (VPN), another network, etc. UI 620 may require security measures before being accessed, for example password authentication, secure access via an intranet or VPN, etc. In some embodiments, UI 620 may be directly accessed as a local application, client application, etc., and is not limited by the present disclosure.

In this example, the milestones include Verify Payment 622, Submit Payment 624, Decline Payment 626, Ship Order 628, and Return Order 630. In some examples, some of these milestones and/or metrics may be mutually exclusive or interdependent. For example, one of Submit Payment 624 or Decline Payment 626 may occur, but not both. Furthermore, Ship Order 628 may occur only if Submit Payment 624 completes successfully.

In an example, the user can define more granular metrics, which may measure progress toward each milestone in the flow. For example, there can be multiple metrics defined for each milestone. For example, Verify Payment 622, Submit Payment 624, and Decline Payment 626 may all be metrics associated with the payment processing milestone 606 of the example of FIG. 6A.

Figure 6C:
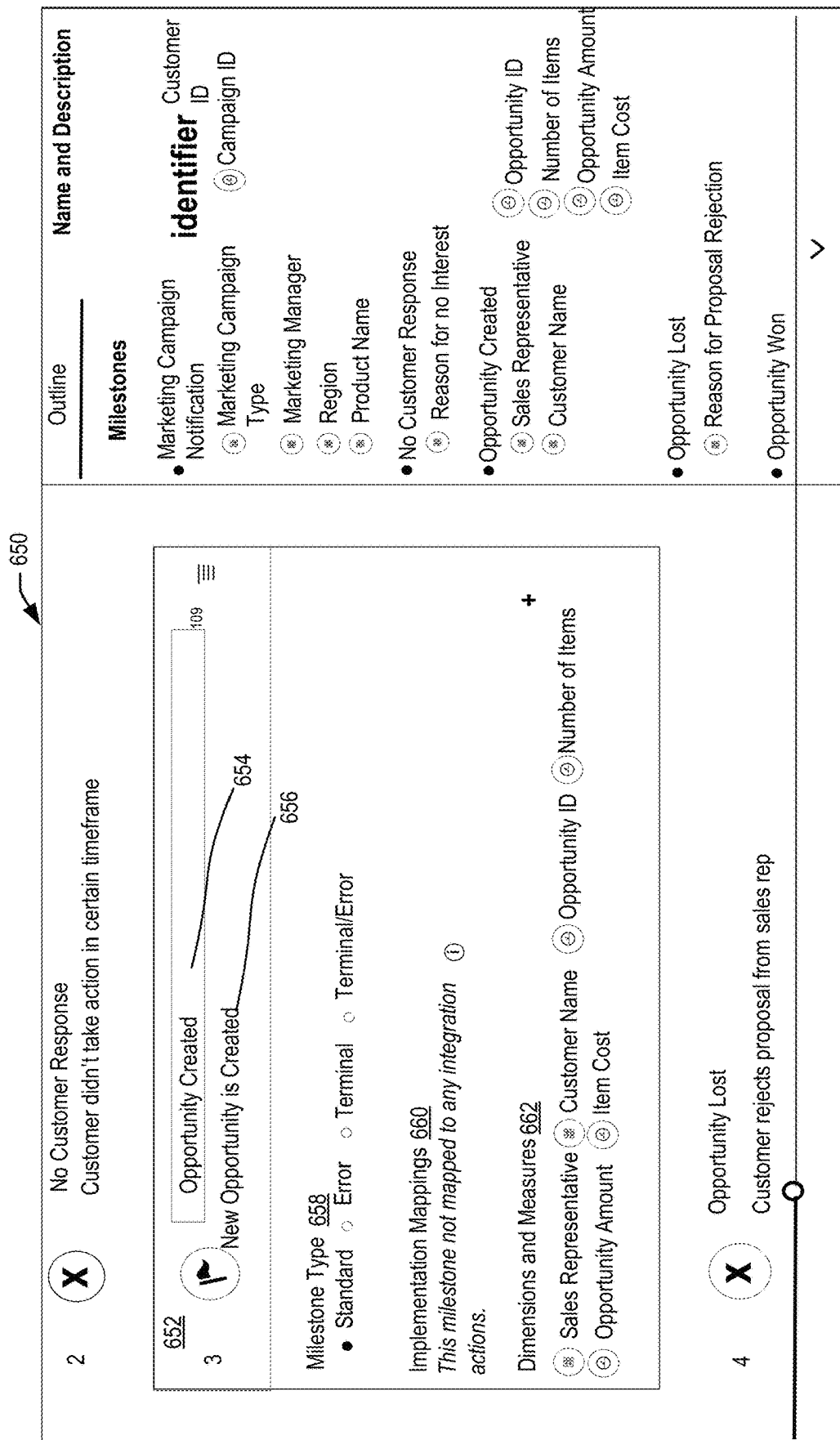
FIG. 6C illustrates an example user interface view for defining details of a respective milestone of an organizational process, in accordance with an embodiment of the present disclosure.

FIG. 6C illustrates an example user interface view 650 for defining details of a respective milestone of an organizational process, in accordance with an embodiment of the present disclosure. In an embodiment, UI 650 may be cloud-based or accessible via the Internet, an intranet or virtual private network (VPN), or another network. In another embodiment, UI 650 may be directly accessed as a local application, client application, etc., and is not limited by the present disclosure.

In this example, UI 650 includes a list of user-defined milestones. In an example, the user may be an integration architect or administrator, who has permission to define and edit milestones and/or map a model organizational process flow. In another example, the user may include a business analyst or business executive, and is not limited by the present disclosure. The user may be an organizational member who has the requisite skills and knowledge to design the organizational process flow. However, using the disclosed system and methods, the user can define and map the flow, and/or display and analyze associated metrics and statistics, without being an Information Technology (IT) specialist.

In particular, milestone 652 is shown in an expanded view for editing by the user. The view includes editable fields, enabling the user to define a milestone title 654 and a short milestone description 656. In this example, the title 654 of milestone 652 is "Opportunity Created," and the description 656 is "New Opportunity is Created." In an embodiment, each milestone may be associated with a table of an underlying database, such as database 106 of the example of FIG. 1, and accordingly may have a number of attributes that may be defined and/or selected by the user. For example, milestone 652 has a Milestone Type 658, which in this case is Standard. Milestone 652 can also have implementation mappings 660 and/or Dimensions and Measures 662. In this example, Dimensions and Measures 662 of milestone 652 include Sales Representative, Customer Name, Opportunity ID, Number of Items, Opportunity Amount, and Item Cost. Title 654 and description 656 may be string-valued attributes, while Milestone Type 658 may be a discrete-valued attribute, and Dimensions and Measures 662 may include both string and numeric attributes. In particular, Sales Representative and Customer Name of Dimensions and Measures 662 may be string-valued, while Opportunity ID, Number of Items, Opportunity Amount, and Item Cost may be numeric. Alternatively, Sales Representative of Dimensions and Measures 662 may be discrete-valued, and is not limited by the present disclosure. By defining or selecting such attributes, the user can define details of the milestones, such as milestone 652, and thereby determine parameters and details of the process flow. A user may further use the UI to define interactions and/or interdependencies among the milestones, as in the example of FIG. 6D below.

Figure 6D:
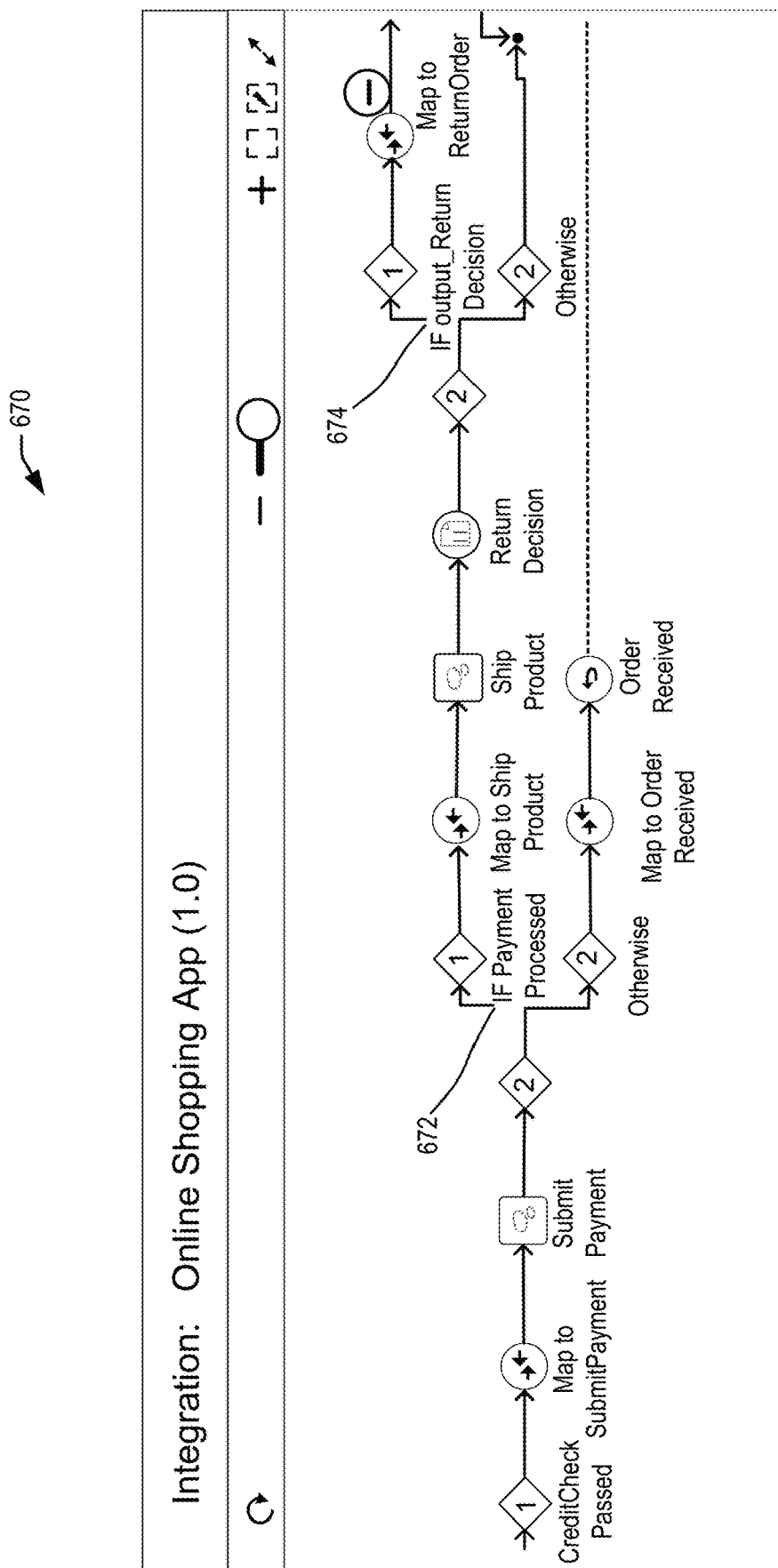
FIG. 6D illustrates an example user interface view for mapping milestones to activities within an implementation of an organizational process, in accordance with an embodiment of the present disclosure.

FIG. 6D illustrates an example user interface view 670 for mapping milestones to activities within an implementation of an organizational process, in accordance with an embodiment of the present disclosure. In an embodiment, UI 670 may be cloud-based or accessible via the Internet, an intranet or virtual private network (VPN), or another network. In another embodiment, UI 670 may be directly accessed as a local application, client application, etc., and is not limited by the present disclosure. In an example, the user may be an integration architect or administrator, who has permission to define and edit milestones and/or map a model organizational process flow. The user may be an organizational member who has the requisite skills and knowledge to design the process flow, but is not necessarily required to be an IT specialist in order to use the disclosed system successfully.

The user can use UI 670 to define a map of how the milestones fit together in the process flow. In this example, the milestones, such as those defined in the examples of FIGS. 6A, 6B, and 6C above, may be displayed on UI 670 in map form. Many of the milestones are connected in sequential, linear fashion. However, the map also contains IF statements 672 and 674, where the process flow splits into separate branches. For example, at IF statement 672, if the Payment Processed metric has completed successfully, the flow may map to the Ship Product milestone. Likewise, at IF statement 674, if the Return Decision metric is affirmative, the flow may map to a Return Order milestone, and otherwise may continue.

In an embodiment, the map can also contain looping constructs that return the flow to earlier milestones in the sequence. For example, if the Payment Processed condition is not fulfilled at statement 672, the map may return to the Order Received milestone. Accordingly, by combining conditional or logical statements with looping constructs, the map may include complex flows.

Thus, the user can define the logic and behavior of the organizational process flow in different situations using UI 670. Based on the user's definitions, such as those in the examples of FIGS. 6C and 6D, the system can transmit and/or publish events for each milestone containing information relevant to the milestone. For example, the events may contain information about the outcomes of the milestones in the process flow. The system can further incorporate the information in these events into an underlying database, as disclosed herein. The system can then use the underlying database to present updated metrics and statistics in a dashboard UI, as in the example of FIG. 7 below.

Figure 7:
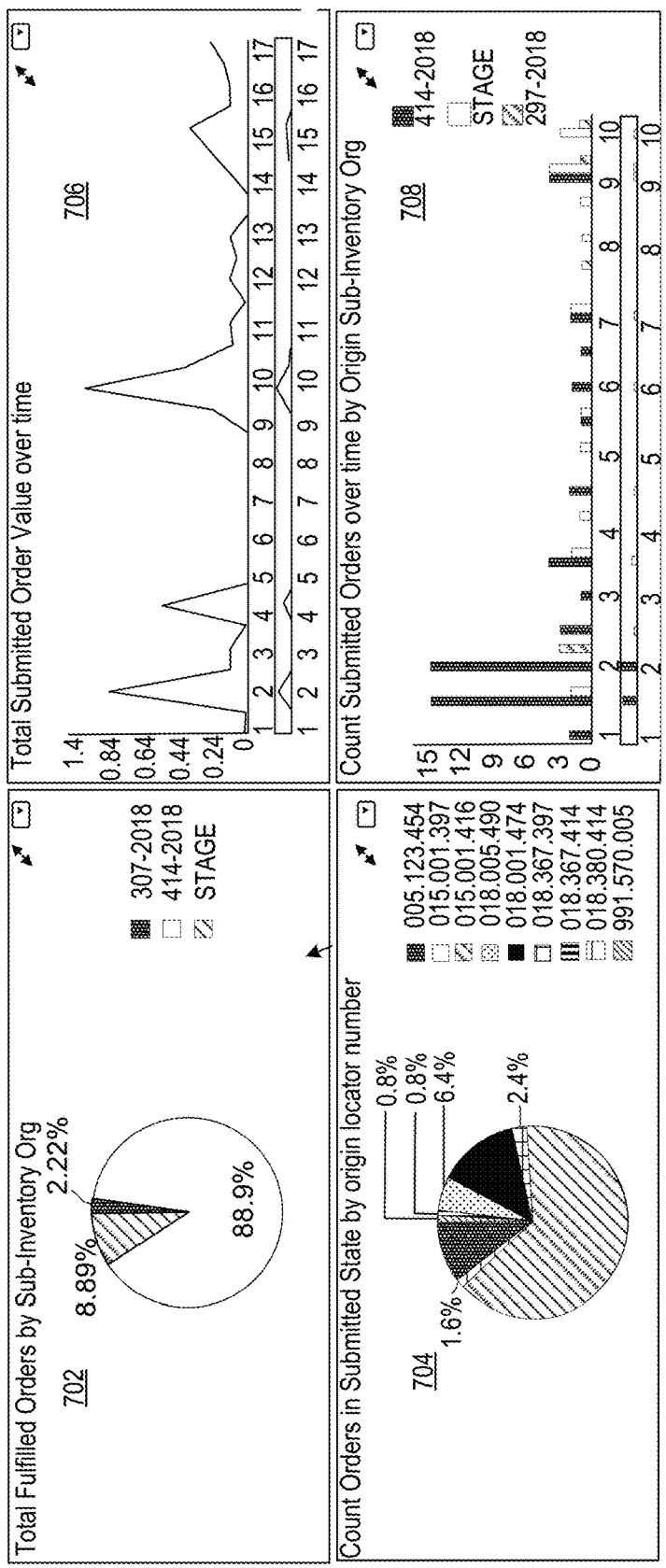
FIG. 7 illustrates an example dashboard user interface for mapping updated organizational process metrics using incoming data from an event stream to update a database, in accordance with an embodiment of the present disclosure.

FIG. 7 illustrates an example dashboard user interface 700 for mapping updated organizational process metrics using incoming data from an event stream to update a database, in accordance with an embodiment of the present disclosure. Once the model has been defined, including milestones and metrics, and incoming events have been processed, a user can view continuously updated statistics from the model via the dashboard 700. In an example, the user can be a business analyst or business executive, who has permission to generate and view reports. In another example, the user may include an integration architect or administrator, and is not limited by the present disclosure. In an embodiment, dashboard user interface 700 may be a cloud-based interface, for example accessible via a web browser from an Internet site, an intranet page, etc. Dashboard 700 may require security measures before being accessed, for example password authentication, access via an intranet or virtual private network (VPN), etc. In some embodiments, dashboard 700 may be directly accessed as a local application, client application, etc., and is not limited by the present disclosure.

In an embodiment, dashboard 700 displays up-to-date metrics and statistics in real time, based on the defined model and its milestones. In an embodiment, the dashboard 700 may update at predefined intervals, e.g. every 30 seconds or 100 seconds. In another embodiment, dashboard 700 may update in response to new data being available, for example every time a new event arrives, or every time a trigger causes the underlying database to be updated. Thus, dashboard 700 may show statistics based on the latest event data to arrive. Note that such real-time updates to dashboard 700, even in a multi-tenant (MT) configuration, may be enabled by efficient updates of the underlying database using in-memory stitching, as disclosed herein. The disclosed system and methods can tie disparate flows together in a single model, thereby providing accurate data to dashboard 700 in real time.

Dashboard 700 may display the updated statistics graphically, such as in pie charts 702 and 704, line chart 706, and bar chart 708. A user may customize the view, for example by choosing what statistics and metrics are graphed, how they are graphed, domains and/or ranges of the graphs, how frequently the graphs are updated, etc. Dashboard 700 may process, aggregate, compute statistics from, and/or run statistical tests on the data before displaying them. In this example, pie chart 702 shows Total Fulfilled Orders by Sub-Inventory Org code, pie chart 704 shows Count Orders in Submitted State by origin locator number, line chart 706 shows Total Submitted Order Value over time, and bar chart 708 shows Count Submitted Orders over time by Origin Sub-Inventory Org code.

In an embodiment, the users may use dashboard 700 to monitor metrics associated with service-level agreements (SLAs) between an organization and its customers, other organizations, etc. For example, the metrics displayed by dashboard 700 may enable the users to determine whether organizational performance is satisfactory, as prescribed by the SLA. Using the dashboard 700, organizational users can also determine, in real time, whether any problems threaten to disrupt the organization from meeting the SLA. Accordingly, the users can take timely remedial action, as necessary.

Illustrative Processes

Figure 8:
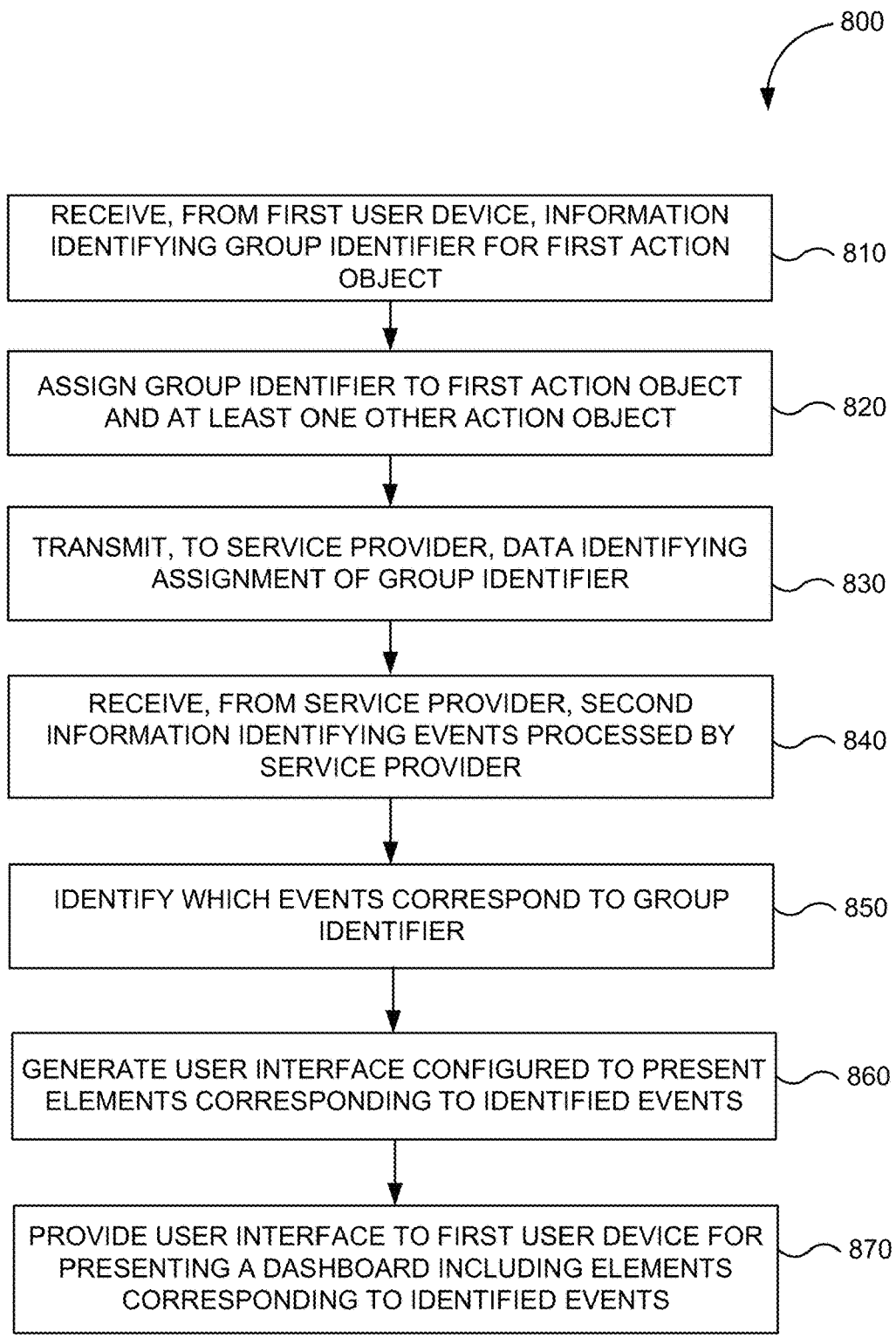
FIG. 8 illustrates a flow diagram of an example process for federating events based on a shared value of a key attribute, in accordance with one embodiment of the present disclosure.
Figure 9:
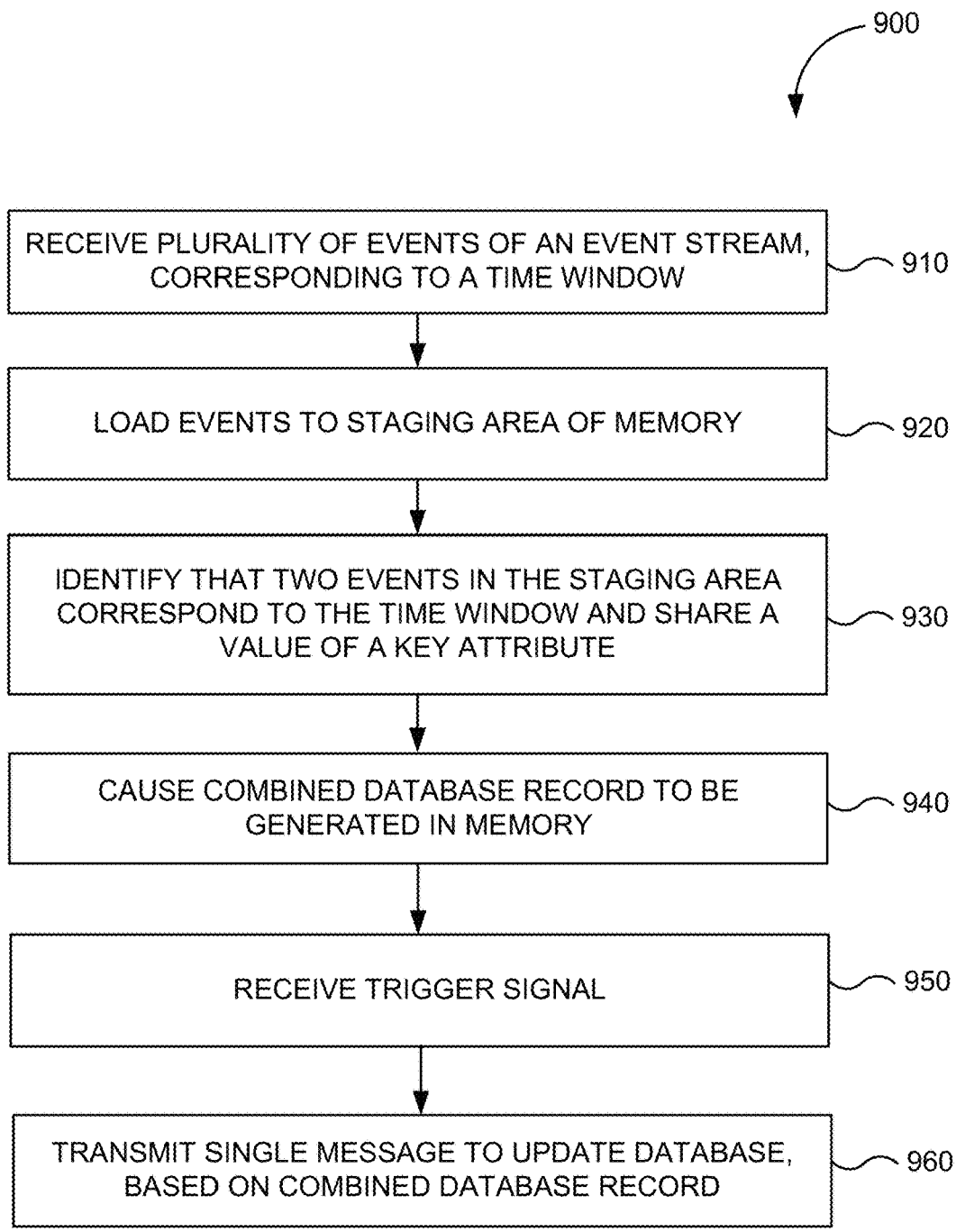
FIG. 9 illustrates a flow diagram of an example process for integrating and processing incoming data from an event stream using in-memory stitching, and updating a database in real time, in accordance with one embodiment of the present disclosure.

FIGS. 8-9 illustrate example flow diagrams showing respective processes 800 and 900 of integrating and processing incoming data from an event stream and updating a database in real time, according to certain embodiments of the present disclosure. These processes are illustrated as logical flow diagrams, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the methods 800 and 900 may be performed by a plurality of processors in parallel. The computer-readable storage medium may be non-transitory. In some examples, the system for integrating and processing incoming data from an event stream and updating a database in real time shown in at least FIGS. 1-2 and 11-13 (and others) may perform the processes 800 and 900 of FIGS. 8-9 respectively.

FIG. 8 illustrates a flow diagram of an example process 800 for federating events based on a shared value of a key attribute, in accordance with one embodiment of the present disclosure. Process 800 may also be referred to as identifier (ID) federation. The key attribute may be an ID value. In various examples, the ID may correspond to an invoice ID, order ID, instance ID, agent ID, etc.

The process 800 may begin at operation 810, when the system receives, from a first user device, first information that identifies a group identifier for a first action object of a plurality of action objects. In an embodiment, the first information is received from a configuration user interface (UI) of the first user device.

Next, at operation 820, the system can assign the group identifier to the first action object and to at least one other action object.

Next, at operation 830, the system can transmit, to a service provider, data that identifies the assignment of the group identifier to the first action object and to the at least one other action object. In an embodiment, the service provider comprises an in-memory stitching engine. In an embodiment, the in-memory stitching engine is configured to stitch events corresponding to a same identifier value. For example, the in-memory stitching engine can be configured to stitch events corresponding to at least one of the first action object or the at least one other action object.

Next, at operation 840, the system can receive, from the service provider, second information that identifies events processed by the service provider. In an embodiment, the service provider comprises an in-memory stitching engine. The in-memory stitching engine may be configured to stitch events corresponding to a same identifier value, for example, events corresponding to at least one of the first action object or the at least one other action object. In an embodiment, the second information that identifies events processed by the service provider comprises event data that corresponds to at least one of the first action object or the at least one other action object.

Next, at operation 850, the system can identify which of the received events correspond to the group identifier.

Next, at operation 860, the system can generate a user interface (UI) configured to present elements that correspond to the identified events. In an embodiment, when the second information comprises event data that corresponds to at least one of the first action object or the at least one other action object, the UI is generated based at least in part on the first action object or the at least one other action object corresponding to the group identifier.

Finally, at operation 870, the system can provide the UI to the first user device for presenting a dashboard that includes the elements that correspond to the identified events.

In an embodiment, the system can further generate a configuration UI configured to present the plurality of action objects for each of a plurality of workflows. In an embodiment, at least some of the plurality of workflows correspond to different respective applications executed on behalf of the first user device. In an embodiment, the system can further provide the configuration UI for presentation at the first user device. In an embodiment, the at least one other action object corresponds to a different workflow of the plurality of workflows from a first workflow of the plurality of workflows that correspond to the first action object.

FIG. 9 illustrates a flow diagram of an example process 900 for integrating and processing incoming data from an event stream using in-memory stitching, and updating a database in real time, in accordance with one embodiment of the present disclosure. In some embodiments, process 900 may occur after an ID federation process, such as process 800 in the example of FIG. 8 above.

The process 900 may begin at operation 910, when the system receives a plurality of events of an event stream. The plurality of events can correspond to a time interval of a watermark. In an embodiment, the watermark may discard the events stored in the staging area, or in-memory buffer, after a watermark time interval. The watermark time interval may be longer than a trigger interval, wherein the trigger interval determines when the underlying database is updated using the in-memory records in the staging area. Accordingly, a trigger signal is expected to occur at least once during every watermark time interval.

At operation 920, the system can load the plurality of events corresponding to the time interval of the watermark to a staging area of a memory. In various embodiments, the memory may be a memory accessible to the system, such as a shared memory, and/or may be a memory belonging to or directly associated with the system. In an embodiment, the system can generate in-memory records comprising the information in the events corresponding to the time interval. For example, the system can expand the information in the events by entering the information in attributes of in-memory records, and filling any attributes missing from the events with "Null" values.

Next, at operation 930, the system can identify that a first event and a second event of the plurality of events in the staging area correspond to the time interval of the watermark and share a value of a key attribute. The key attribute may be an identifier (ID) value. In various examples, the ID may correspond to an invoice ID, order ID, instance ID, agent ID, etc., and is not limited by the present disclosure.

Next, at operation 940, the system can cause a combined database record to be generated in the memory. The combined database record can include a combination of at least first attribute information from the first event, second attribute information from the second event, and the value of the key attribute. Causing the combined database record to be generated in the memory may also be referred to as in-memory stitching, and the combined database record may be referred to as an in-memory record.

In an embodiment, causing the combined database record to be generated can comprise applying a User Defined Aggregation Function (UDAF) or a custom function. In an embodiment, causing the combined database record to be generated comprises binding the first attribute information from the first event and the second attribute information from the second event together, based at least in part on the first and second events sharing the value of the key attribute.

Next, at operation 950, the system can receive a trigger signal. The trigger signal may determine when the underlying database is updated based on the in-memory records stored in the staging area. In some embodiments, the trigger signal may arrive at regular intervals, referred to as a trigger interval. Alternatively, the trigger signal may arrive according to any other schedule, and is not limited by the present disclosure. The watermark time interval, as in operation 910, may be longer than the trigger interval.

Finally, at operation 960, in response to receiving the trigger signal, the system can transmit a single message to update a database. In an embodiment, the system transmits the message to a database manager. The single message may be based at least in part on the combined database record, for example the message may contain the combined database record, or information therein.

The single message may comprise a database merge statement. The merge statement may be a single JDBC call that inserts the record if it does not exist, or updates the record if the record does already exist. The database merge statement may comprise a Java Database Connectivity (JDBC) statement or a Hive statement. Alternatively, the single message may comprise a database update statement, a database create statement, a database delete statement, and/or a database insert statement. In some embodiments, the system may instead transmit multiple messages, and is not limited by the present disclosure.

In an embodiment, the single message to update the database can be further based at least in part on a second combined database record, or a plurality of combined database records, in the memory. The second combined database record can include attribute information from other events corresponding to the time interval of the watermark, and sharing a second value of the key attribute. In the case of a plurality of combined database records, they can include attribute information from events corresponding to the time interval of the watermark, and sharing a plurality of values of the key attribute.

Illustrative Systems

Figure 10:
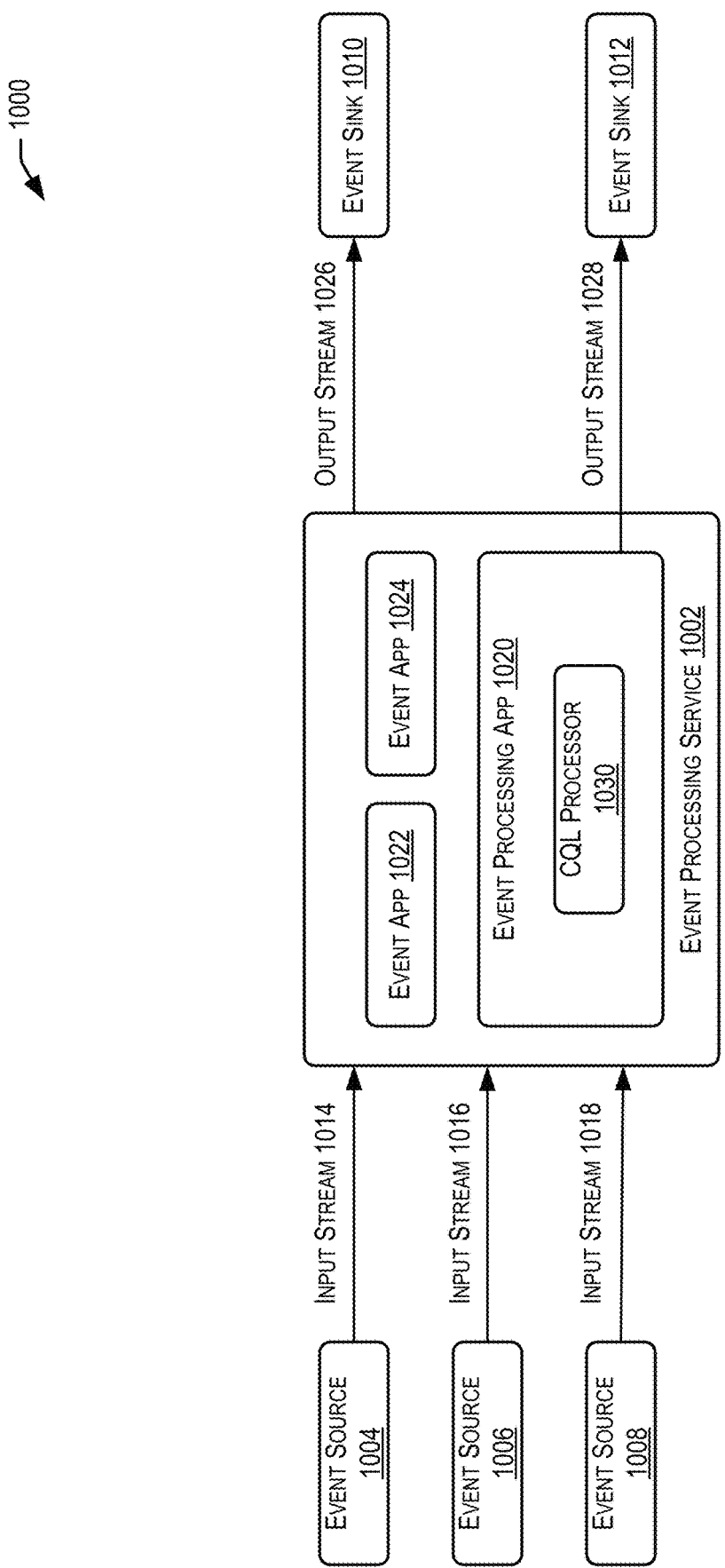
FIG. 10 is an illustration of a simplified high level diagram of an event processing system in accordance with an embodiment of the present disclosure.

FIGS. 10-13 illustrate aspects of example environments for implementing aspects of the present disclosure in accordance with various embodiments. FIG. 10 depicts a simplified high level diagram of an event processing system 1000 that may incorporate an embodiment of the present disclosure. Event processing system 1000 may comprise one or more event sources (1004, 1006, 1008), an event processing service (EPS) 1002 (also referred to as CQ Service 1002) that is configured to provide an environment for processing event streams, and one or more event sinks (1010, 1012). The event sources generate event streams that are received by EPS 1002. EPS 1002 may receive one or more event streams from one or more event sources. For example, as shown in FIG. 10, EPS 1002 receives a first input event stream 1014 from event source 1004, a second input event stream 1016 from event source 1006, and a third event stream 1018 from event source 1008. One or more event processing applications (1020, 1022, and 1024) may be deployed on and be executed by EPS 1002. An event processing application executed by EPS 1002 may be configured to listen to one or more input event streams, process the events received via the one or more event streams based upon processing logic that selects one or more events from the input event streams as notable events. The notable events may then be sent to one or more event sinks (1010, 1012) in the form of one or more output event streams. For example, in FIG. 10, EPS 1002 outputs a first output event stream 1026 to event sink 1010, and a second output event stream 1028 to event sink 1012. In certain embodiments, event sources, event processing applications, and event sinks are decoupled from each other such that one can add or remove any of these components without causing changes to the other components.

In one embodiment, EPS 1002 may be implemented as a Java server comprising a lightweight Java application container, such as one based upon Equinox OSGi, with shared services. In some embodiments, EPS 1002 may support ultra-high throughput and microsecond latency for processing events, for example, by using JRockit Real Time. EPS 1002 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 10 provides a drilldown for one such event processing application 1020. As shown in FIG. 10, event processing application 1020 is configured to listen to input event stream 1018, execute a continuous query 1030 comprising logic for selecting one or more notable events from input event stream 1018, and output the selected notable events via output event stream 1028 to event sink 1012. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 1020 in FIG. 10 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 1002 without having to store all the received events data. Accordingly, EPS 1002 provides a special querying mechanism that enables processing of events to be performed as the events are received by EPS 1002 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries may perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 1002 for a particular event stream may be executed each time that an event is received in that event stream. As part of the continuous query execution, EPS 1002 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:
(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.
(2) One or more channels that act as event processing endpoints. Among other things, channels are responsible for queuing event data until the event processing agent can act upon it.
(2) One or more application processors (or event processing agents) are configured to consume normalized event data from a channel, process it using queries to select notable events, and forward (or copy) the selected notable events to an output channel.
(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.
(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 1000 depicted in FIG. 10 may have other components than those depicted in FIG. 10. Further, the embodiment shown in FIG. 10 is only one example of a system that may incorporate an embodiment of the present disclosure. In some other embodiments, system 1000 may have more or fewer components than shown in FIG. 10, may combine two or more components, or may have a different configuration or arrangement of components. System 1000 can be of various types including a service provider computer, a personal computer, a portable device (e.g., a mobile telephone or device), a workstation, a network computer, a mainframe, a kiosk, a server, or any other data processing system. In some other embodiments, system 1000 may be configured as a distributed system where one or more components of system 1000 are distributed across one or more networks in the cloud.

The one or more of the components depicted in FIG. 10 may be implemented in software, in hardware, or in combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 11:
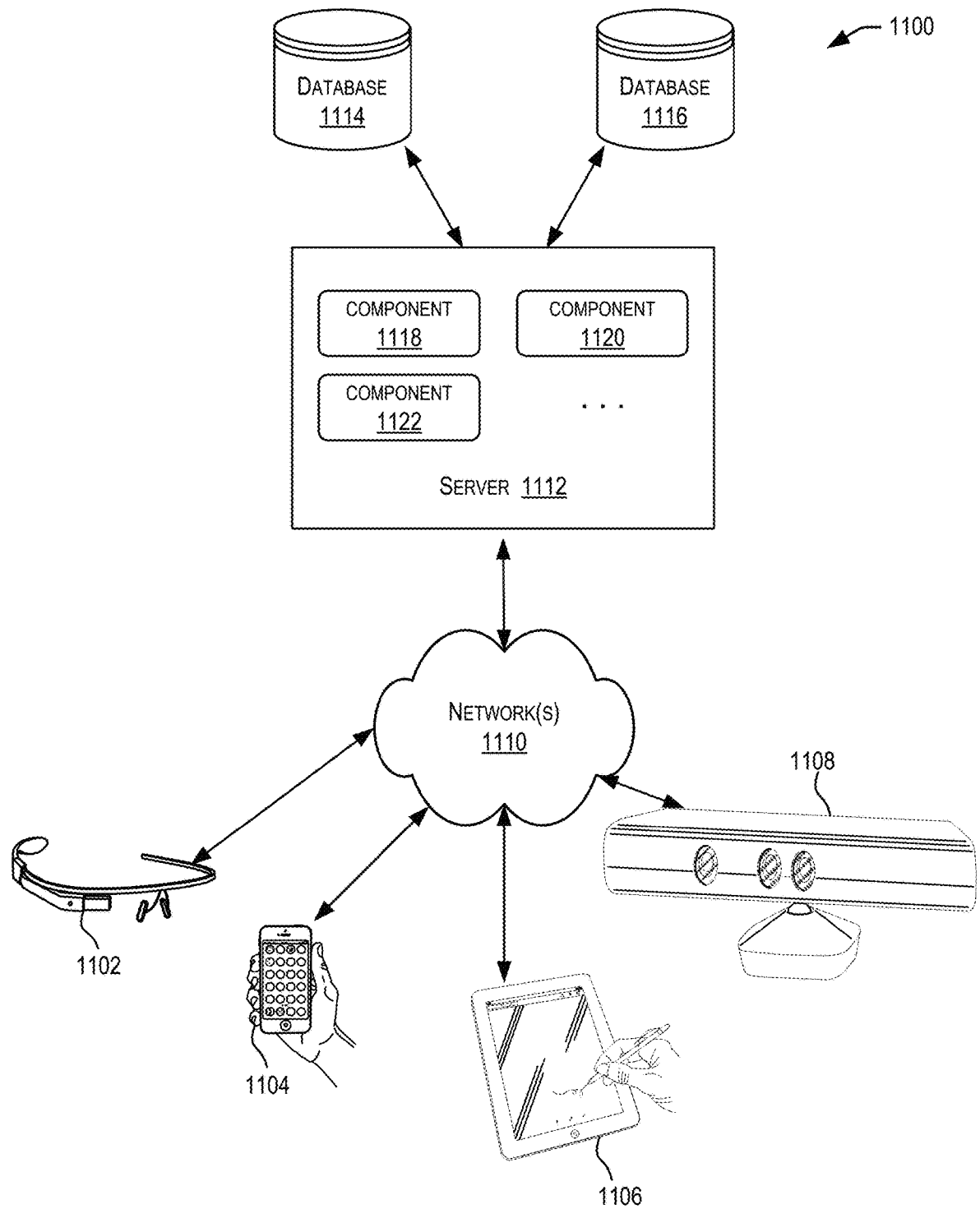
FIG. 11 depicts a simplified diagram of a distributed system for implementing an embodiment of the present disclosure.

FIG. 11 depicts a simplified diagram of a distributed system 1100 for implementing an embodiment of the present disclosure. In the illustrated embodiment, the distributed system 1100 includes one or more client computing devices 1102, 1104, 1106, and 1108, which are configured to execute and operate a client application such as a web browser, proprietary client (e.g., Oracle Forms), or the like over one or more network(s) 1110. The server 1112 may be communicatively coupled with the remote client computing devices 1102, 1104, 1106, and 1108 via network 1110.

In various embodiments, the server 1112 may be adapted to run one or more services or software applications such as services and applications that provide identity management services. In certain embodiments, the server 1112 may also provide other services or software applications can include non-virtual and virtual environments. In some embodiments, these services may be offered as web-based or cloud services or under a Software as a Service (Saas) model to the users of the client computing devices 1102, 1104, 1106, and/or 1108. Users operating the client computing devices 1102, 1104, 1106, and/or 1108 may in turn utilize one or more client applications to interact with the server 1112 to utilize the services provided by these components.

In the configuration depicted in FIG. 11, the software components 1118, 1120 and 1122 of system 1100 are shown as being implemented on the server 1112. In other embodiments, one or more of the components of the system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in FIG. 11 is thus one example of a distributed system for implementing an embodiment system and is not intended to be limiting.

The client computing devices 1102, 1104, 1106, and/or 1108 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1110.

Although distributed system 1100 in FIG. 11 is shown with four client computing devices, any number of client computing devices may be supported. Other devices, such as devices with sensors, etc., may interact with the server 1112.

The network(s) 1110 in the distributed system 1100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1110 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1112 can include one or more virtual machines running virtual operating systems, or other computing architectures involving virtualization. One or more flexible pools of logical storage devices can be virtualized to maintain virtual storage devices for the server. Virtual networks can be controlled by the server 1112 using software defined networking. In various embodiments, the server 1112 may be adapted to run one or more services or software applications described in the foregoing disclosure. For example, the server 1112 may correspond to a server for performing processing as described above according to an embodiment of the present disclosure.

The server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 1112 may include one or more applications to analyze and consolidate data feeds and/or event updates received from users of the client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1112 may also include one or more applications to display the data feeds and/or real-time events via one or more display devices of the client computing devices 1102, 1104, 1106, and 1108.

The distributed system 1100 may also include one or more databases 1114 and 1116. These databases may provide a mechanism for storing information such as user identity information, and other information used by embodiments of the present disclosure. Databases 1114 and 1116 may reside in a variety of locations. By way of example, one or more of databases 1114 and 1116 may reside on a non-transitory storage medium local to (and/or resident in) the server 1112.

Alternatively, the databases 1114 and 1116 may be remote from the server 1112 and in communication with the server 1112 via a network-based or dedicated connection. In one set of embodiments, the databases 1114 and 1116 may reside in a storage-area network (SAN). Similarly, any necessary files for performing the functions attributed to the server 1112 may be stored locally on the server 1112 and/or remotely, as appropriate. In one set of embodiments, the databases 1114 and 1116 may include relational databases, such as databases provided by Oracle, that are adapted to store, update, and retrieve data in response to SQL-formatted commands.

Figure 12:
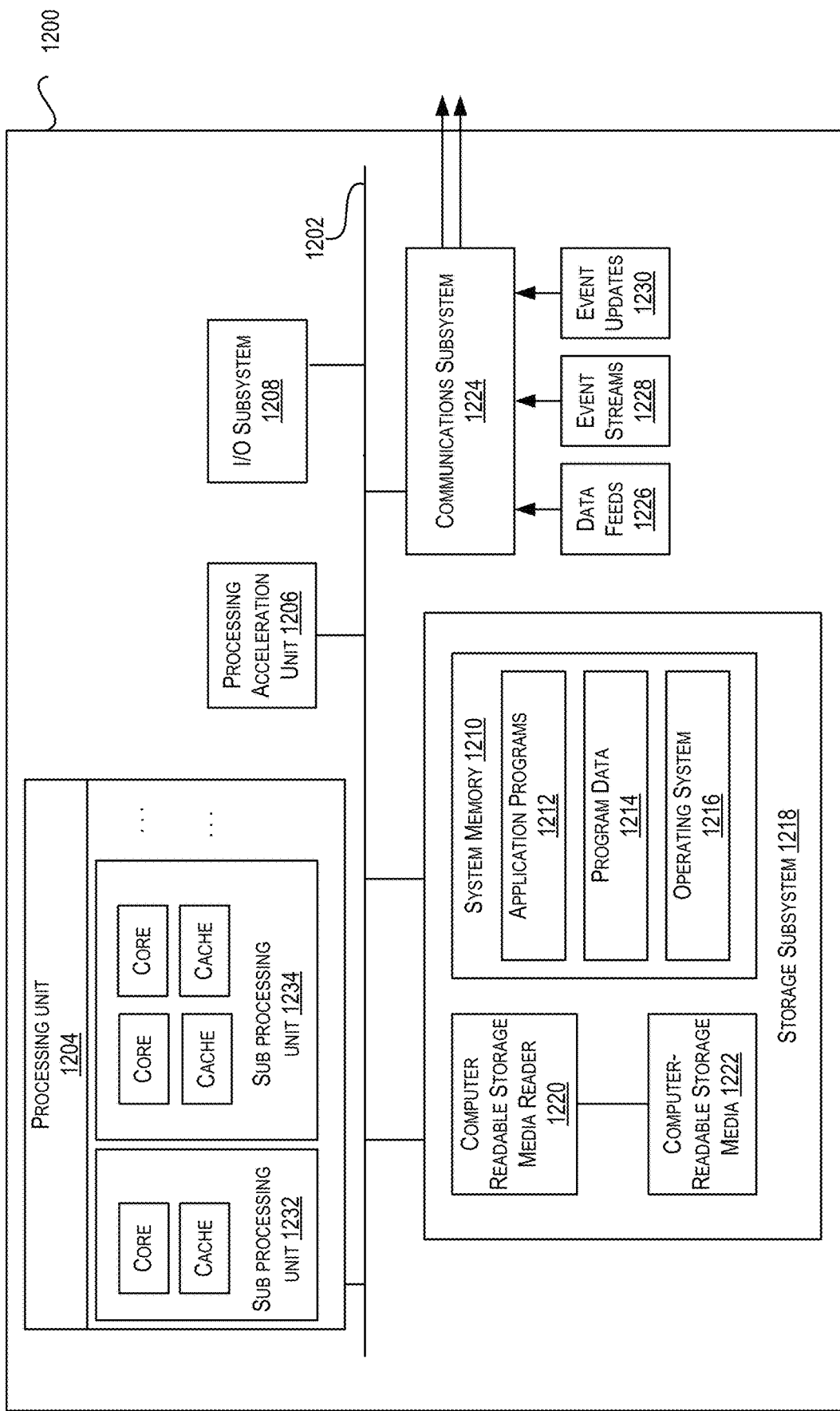
FIG. 12 is a simplified block diagram of one or more components of a system environment by which services provided by one or more components of an embodiment system may be offered as cloud services, in accordance with an embodiment of the present disclosure.

FIG. 12 illustrates an example computer system 1200 that may be used to implement an embodiment of the present disclosure. In some embodiments, computer system 1200 may be used to implement any of the various servers and computer systems described above. As shown in FIG. 12, computer system 1200 includes various subsystems including a processing subsystem 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 may include tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processing units 1232, 1234, etc. A processing unit may include be one or more processors, including single core or multicore processors, one or more cores of processors, or combinations thereof. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1210 including potentially on one or more storage devices. Through suitable programming, processing subsystem 1204 can provide various functionalities described above for dynamically modifying documents (e.g., webpages) responsive to usage patterns.

In certain embodiments, a processing acceleration unit 1206 may be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term "input device" is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information that is used by computer system 1200. Storage subsystem 1218 provides a tangible non-transitory computer-readable storage medium for storing the basic programming and data constructs that provide the functionality of some embodiments. Software (programs, code modules, instructions) that when executed by processing subsystem 1204 provide the functionality described above may be stored in storage subsystem 1218. The software may be executed by one or more processing units of processing subsystem 1204. Storage subsystem 1218 may also provide a repository for storing data used in accordance with the present disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may be stored in the ROM. The RAM may contain data and/or program modules that are presently being operated and executed by processing subsystem 1204. In some implementations, system memory 1210 may include multiple different types of memory, such as static random access memory (SRAM) or dynamic random access memory (DRAM).

By way of example, and not limitation, as depicted in FIG. 12, system memory 1210 may store application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1222 may store programming and data constructs that provide the functionality of some embodiments. Software (programs, code modules, instructions) that when executed by processing subsystem 1204 a processor provide the functionality described above may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1222 may provide storage of computer-readable instructions, data structures, program modules, and other data for computer system 1200.

In certain embodiments, storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for storing computer-readable information.

In certain embodiments, computer system 1200 may provide support for executing one or more virtual machines. Computer system 1200 may execute a program such as a hypervisor for facilitating the configuring and managing of the virtual machines. Each virtual machine may be allocated memory, compute (e.g., processors, cores), I/O, and networking resources. Each virtual machine may run its own operating system, which may be the same as or different from the operating systems executed by other virtual machines executed by computer system 1200. Accordingly, multiple operating systems may potentially be run concurrently by computer system 1200. Each virtual machine generally runs independently of the other virtual machines.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. Additionally, communication subsystem 1224 may be used to communicate notifications of successful logins or notifications to re-enter a password from the privileged account manager to the requesting users.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, communications subsystem 1224 may receive input communication in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, California, may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services may facilitate the management and control of the underlying computing resources, such as storage, networks, and other fundamental computing resources for customers utilizing services provided by the SaaS platform and the PaaS platform.

Figure 13:
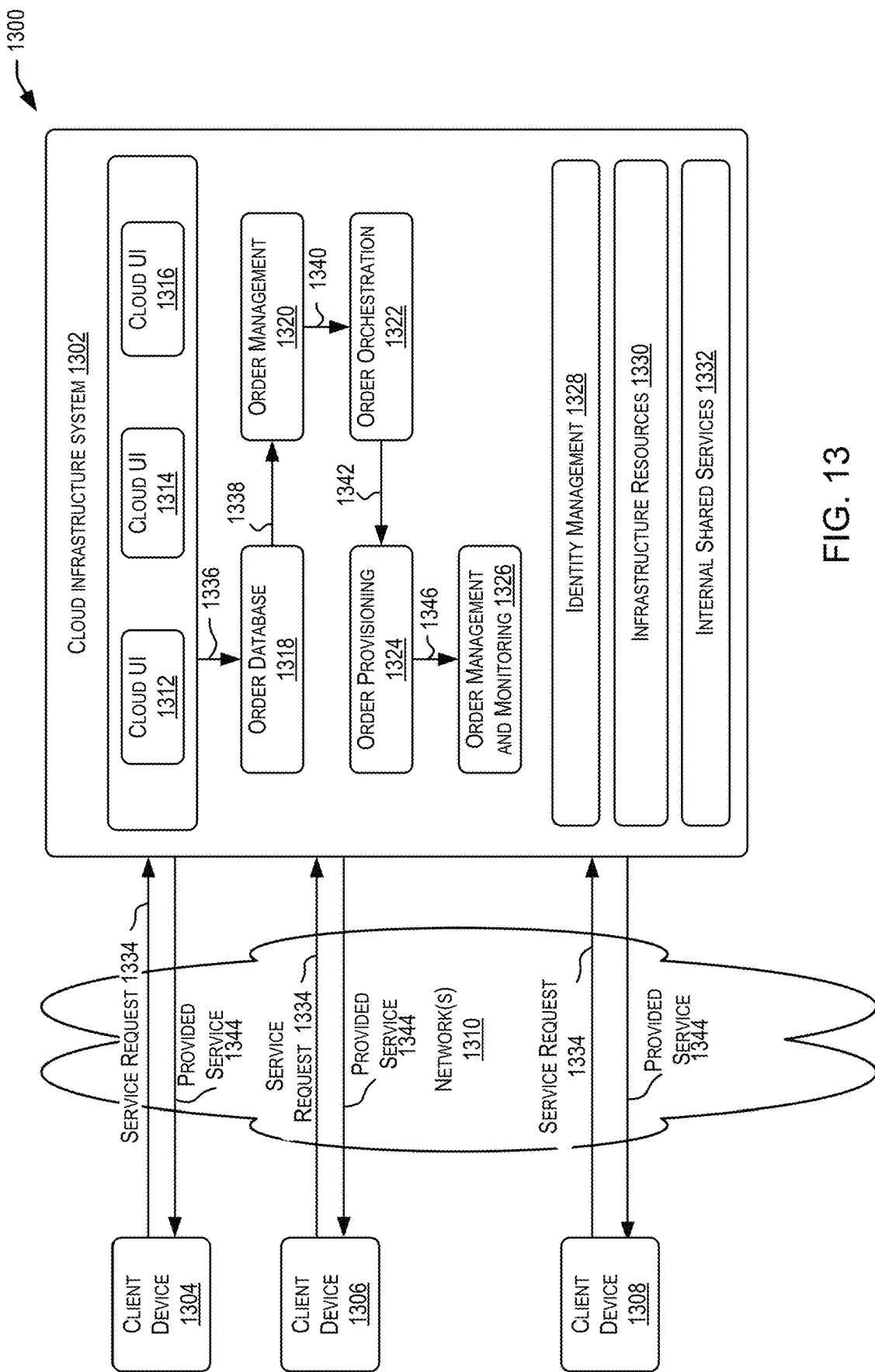
FIG. 13 illustrates an example computer system that may be used to implement an embodiment of the present disclosure.

FIG. 13 is a simplified block diagram of one or more components of a system environment 1300 by which services provided by one or more components of an embodiment system may be offered as cloud services, in accordance with an embodiment of the present disclosure. In the illustrated embodiment, system environment 1300 includes one or more client computing devices 1304, 1306, and 1308 that may be used by users to interact with a cloud infrastructure system 1302 that provides cloud services. The client computing devices may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302.

It should be appreciated that cloud infrastructure system 1302 depicted in the figure may have other components than those depicted. Further, the embodiment shown in the figure is only one example of a cloud infrastructure system that may incorporate an embodiment of the disclosure. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1102, 1104, 1106, and 1108.

Although example system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1110.

Cloud infrastructure system 1302 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." In a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform.

In some embodiments, resources in cloud infrastructure system 1302 may be shared by multiple users and dynamically re-allocated per demand. Additionally, resources may be allocated to users in different time zones. For example, cloud infrastructure system 1330 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 and by the services provided by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in the figure, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In example operation 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI), cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

After an order has been placed by the customer, the order information is received via the cloud UIs, 1312, 1314 and/or 1316.

At operation 1336, the order is stored in order database 1318. Order database 1318 can be one of several databases operated by cloud infrastructure system 1318 and operated in conjunction with other system elements.

At operation 1338, the order information is forwarded to an order management module 1320. In some instances, order management module 1320 may be configured to perform billing and accounting functions related to the order, such as verifying the order, and upon verification, booking the order.

At operation 1340, information regarding the order is communicated to an order orchestration module 1322. Order orchestration module 1322 may utilize the order information to orchestrate the provisioning of services and resources for the order placed by the customer. In some instances, order orchestration module 1322 may orchestrate the provisioning of resources to support the subscribed services using the services of order provisioning module 1324.

In certain embodiments, order orchestration module 1322 enables the management of business processes associated with each order and applies business logic to determine whether an order should proceed to provisioning. At operation 1342, upon receiving an order for a new subscription, order orchestration module 1322 sends a request to order provisioning module 1324 to allocate resources and configure those resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. Order orchestration module 1322 may thus be isolated from implementation details, such as whether or not services and resources are actually provisioned on the fly or pre-provisioned and only allocated/assigned upon request.

At operation 1344, once the services and resources are provisioned, a notification of the provided service may be sent to customers on client devices 1304, 1306 and/or 1308 by order provisioning module 1324 of cloud infrastructure system 1302. At operation 1346, the customer's subscription order may be managed and tracked by an order management and monitoring module 1326. In some instances, order management and monitoring module 1326 may be configured to collect usage statistics for the services in the subscription order, such as the amount of storage used, the amount data transferred, the number of users, and the amount of system up time and system down time.

In certain embodiments, cloud infrastructure system 1300 may include an identity management module 1328. Identity management module 1328 may be configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method, comprising:
   receiving, by a computing device and from a first user device, first information that identifies a group identifier for a first action object of a plurality of action objects, the plurality of action objects associated with a process flow;

assigning, by the computing device, the group identifier to the first action object and to at least one other action object transmitting, by the computing device and to a service provider, data that identifies the assignment of the group identifier to the first action object and to the at least one other action object, the service provider comprising an in-memory stitching engine configured to process events associated with the process flow within a random access memory (RAM) of the service provider to create a single in-memory record corresponding to the process flow and indicating at least one of the first action object or the at least one other action object in the RAM of the service provider from a plurality of in-memory records in the RAM of the service provider prior to updating a database, wherein each of the plurality of the in-memory records comprises a respective timestamp and the single in-memory record comprises a single time attribute corresponding to a latest timestamp of the respective timestamps, and wherein identifier (ID) federation is performed on the first action object and the at least one other action object prior to in-memory stitching;

determining, by the computing device, whether the database comprises an entry corresponding to the group identifier;

in response to determining that the database comprises one or more entries corresponding to the group identifier;
replacing, by the computing device, the one or more entries with the single in-memory record;

in response to determining that the database does not include an entry corresponding to the group identifier:
generating, by the computing device, an entry in the database corresponding to the group identifier, the entry comprising the single in-memory record;

receiving, by the computing device and from the service provider, second information that identifies events processed by the service provider, the second information comprising the single in-memory record from the RAM of the service provider;

identifying, by the computing device, which of the received events correspond to the group identifier;

generating, by the computing device, a user interface configured to present elements that correspond to the identified events;

providing, by the computing device, the user interface to the first user device for presenting a dashboard that includes the elements that correspond to the identified events; and removing, by the computing device, the single in-memory record and the plurality of in-memory records from the RAM of the service provider based at least in part on the respective timestamps.

2. The method of claim 1, further comprising generating, by the computing device, a configuration user interface configured to present the plurality of action objects for each of a plurality of workflows.

3. The method of claim 2, wherein at least some of the plurality of workflows correspond to different respective applications executed on behalf of the first user device.

4. The method of claim 2, further comprising providing, by the computing device, the configuration user interface for presentation at the first user device.

5. The method of claim 2, wherein the at least one other action object corresponds to a different workflow of the plurality of workflows from a first workflow of the plurality of workflows that correspond to the first action object.

6. The method of claim 1, wherein the first information is received from a configuration user interface of the first user device.

7. The method of claim 1, wherein the in-memory stitching engine is configured to stitch events corresponding to at least one of the first action object or the at least one other action object.

8. The method of claim 1, wherein the second information that identifies events processed by the service provider comprises event data that corresponds to at least one of the first action object or the at least one other action object.

9. The method of claim 8, wherein the user interface is generated based at least in part on the first action object or the at least one other action object corresponding to the group identifier.

10. A system, comprising:
one or more processors; and
a memory configured to store computer-executable instructions that, when executed by the one or more processors, cause the one or more processors to:
receive by a computing device and from a first user device, first information that identifies a group identifier for a first action object of a plurality of action objects, the plurality of action objects associated with a process flow;
assign, by the computing device, the group identifier to the first action object and to at least one other action object;
transmit, by the computing device and to a service provider, data that identifies the assignment of the group identifier to the first action object and to the at least one other action object, the service provider comprising an in-memory stitching engine configured to process events associated with the process flow within a random access memory of the service provider to create a single in-memory record corresponding to the process flow and indicating at least one of the first action object or the at least one other action object in the RAM of the service provider from a plurality of in-memory records in the RAM of the service provider prior to updating a database, wherein each of the plurality of the in-memory records comprises a respective timestamp, and the single in-memory record comprises a single time attribute corresponding to a latest timestamp of the respective timestamps, and wherein identifier (ID) federation is performed on the first action object and the at least one other action object prior to in-memory stitching;
determining, by the computing device, whether the database comprises an entry corresponding to the group identifier;
in response to determining that the database comprises one or more entries corresponding to the group identifier;
replacing, by the computing device, the one or more entries with the single in-memory record;
in response to determining that the database does not include an entry corresponding to the group identifier:
generating, by the computing device, an entry in the database corresponding to the group identifier, the entry comprising the single in-memory record;
receive, by the computing device and from the service provider, second information that identifies events processed by the service provider, the second information comprising the single in-memory record from the RAM of the service provider;

identify, by the computing device, which of the received events correspond to the group identifier;

generate, by the computing device, a user interface configured to present elements that correspond to the identified events;

provide, by the computing device, the user interface to the first user device for presenting a dashboard that includes the elements that correspond to the identified events; and remove, by the computing device, the single in-memory record or the plurality of in-memory records from the RAM of the service provider based at least in part on the respective timestamps.

11. The system of claim 10, wherein the one or more processors are further caused to generate a configuration user interface configured to present the plurality of action objects for each of a plurality of workflows.

12. The system of claim 11, wherein at least some of the plurality of workflows correspond to different respective applications executed on behalf of the first user device.

13. The system of claim 11, wherein the at least one other action object corresponds to a different workflow of the plurality of workflows from a first workflow of the plurality of workflows that correspond to the first action object.

14. The system of claim 10, wherein the first information is received from a configuration user interface of the first user device.

15. A non-transitory computer-readable medium storing computer-executable instructions that, when executed by a processor, cause the processor to perform operations comprising:

receiving, by a computing device, and from a first user device, first information that identifies a group identifier for a first action object of a plurality of action objects, the plurality of action objects associated with a process flow;

assigning, by the computing device, the group identifier to the first action object and to at least one other action object;

transmitting, by the computing device and to a service provider, data that identifies the assignment of the group identifier to the first action object and to the at least one other action object, the service provider comprising an in-memory stitching engine configured to process events associated with the process flow within a random access memory of the service provider to create a single in-memory record corresponding to the process flow and indicating at least one of the first action object or the at least one other action object in the RAM of the service provider from a plurality of in-memory records in the RAM of the service provider prior to updating a database, wherein each of the plurality of the in-memory records comprises a respective timestamp, and the single in-memory record comprises a single time attribute corresponding to a latest timestamp of the respective timestamps, and wherein identifier (ID) federation is performed on the first action object and the at least one other action object prior to in-memory stitching;

determining, by the computing device, whether the database comprises an entry corresponding to the group identifier;

in response to determining that the database comprises one or more entries corresponding to the group identifier;

replacing, by the computing device, the one or more entries with the single in-memory record;

in response to determining that the database does not include an entry corresponding to the group identifier:

generating, by the computing device, an entry in the database corresponding to the group identifier, the entry comprising the single in-memory record;

receiving, by the computing device and from the service provider, second information that identifies events processed by the service provider, the second information comprising the single in-memory record from the RAM of the service provider;

identifying, by the computing device, which of the received events correspond to the group identifier;

generating, by the computing device, a user interface configured to present elements that correspond to the identified events;

providing, by the computing device, the user interface to the first user device for presenting a dashboard that includes the elements that correspond to the identified events; and removing, by the computing device, the single in-memory record or the plurality of in-memory records from the RAM of the service provider based at least in part on the respective timestamps.

16. The non-transitory computer-readable medium of claim 15, wherein the in-memory stitching engine is configured to stitch events corresponding to at least one of the first action object or the at least one other action object.

17. The non-transitory computer-readable medium of claim 15, wherein the second information that identifies events processed by the service provider comprises event data that corresponds to at least one of the first action object or the at least one other action object.

18. The non-transitory computer-readable medium of claim 17, wherein the user interface is generated based at least in part on the first action object or the at least one other action object corresponding to the group identifier.

19. The system of claim 11, wherein at least some of the plurality of workflows correspond to different respective applications executed on behalf of the first user device.

20. The method of claim 1, wherein at least one of the first action object and the at least one other action object correspond to respective milestones in the process flow.

* * * * *